United States Patent
Liu et al.

(10) Patent No.: US 11,756,151 B1
(45) Date of Patent: Sep. 12, 2023

(54) END-CLOUD COLLABORATIVE MEDIA DATA PROCESSING METHOD AND APPARATUS, DEVICE, AND STORAGE MEDIUM

(71) Applicant: Lemon Inc., Grand Cayman (KY)

(72) Inventors: Chun Liu, Beijing (CN); Qingyu Chen, Los Angeles, CA (US)

(73) Assignee: Lemon, Inc., Grand Cayman (KY)

( * ) Notice: Subject to any disclaimer, the term of this patent is extended or adjusted under 35 U.S.C. 154(b) by 0 days.

(21) Appl. No.: 17/814,127

(22) Filed: Jul. 21, 2022

(30) Foreign Application Priority Data

Mar. 31, 2022 (CN) .......................... 202210344382.4

(51) Int. Cl.
   *G06T 1/60* (2006.01)
   *H04L 67/10* (2022.01)
   *G06T 1/20* (2006.01)

(52) U.S. Cl.
   CPC ................ *G06T 1/20* (2013.01); *H04L 67/10* (2013.01)

(58) Field of Classification Search
   CPC .................................. G06T 1/20; H04L 67/10
   See application file for complete search history.

(56) References Cited

U.S. PATENT DOCUMENTS

2014/0028679 A1 * 1/2014 Pajak ........................ G06T 1/20
                                                                      345/428

FOREIGN PATENT DOCUMENTS

| CN | 110457119 A | 11/2019 | |
| CN | 111131412 A | 5/2020 | |
| WO | WO 2022250662 A1 * | 12/2022 | ........... A63F 13/355 |

* cited by examiner

*Primary Examiner* — Said Broome
*Assistant Examiner* — Donna J. Ricks
(74) *Attorney, Agent, or Firm* — Faegre Drinker Biddle & Reath LLP

(57) ABSTRACT

Embodiments of the present disclosure provide an end-cloud collaborative media data processing method and apparatus, a device and a storage medium, where the method includes: calling a target processing flow in response to a first operation triggering a target functionality, where the target processing flow includes a local algorithm node and a remote algorithm node, and the target functionality is used for adding a special effect to media data to be processed; executing, based on the target processing flow, a corresponding local algorithm node and remote algorithm node to obtain first processing data output by the local algorithm node and second processing data output by the remote algorithm node; and generating third processing data through the first processing data and/or the second processing data.

19 Claims, 11 Drawing Sheets

END-CLOUD COLLABORATIVE MEDIA DATA PROCESSING METHOD AND APPARATUS, DEVICE, AND STORAGE MEDIUM

CROSS-REFERENCE TO RELATED APPLICATION

This application claims priority to Chinese Patent Application No. 202210344382.4, filed on Mar. 31, 2022, which is hereby incorporated by reference in its entirety.

TECHNICAL FIELD

Embodiments of the present disclosure relate to the field of internet technologies and, in particular, to an end-cloud collaborative media data processing method and apparatus, a device, and a storage medium.

BACKGROUND

Currently, in applications (APP) such as short videos and social media, with regard to media data such as pictures and videos uploaded by users, the applications can provide special effect rendering capabilities for the media data and add visual special effects to the media data, for example, adding virtual decorations and filters to videos and images, thereby enriching functionalities and playing methods of the applications.

In prior arts, during special effect rendering of media data based on an application request, an implementation is typically possible through a separate execution of a local algorithm provided by an application client or separate calling of a remote algorithm provided by a server side.

However, for complex special effect rendering, the scheme in the prior art presents problems such as a poor rendering effect and long rendering time.

SUMMARY

Embodiments of the present disclosure provide an end-cloud collaborative media data processing method and apparatus, a device, and a storage medium so as to overcome problems presented during complex special effect rendering, such as a poor rendering effect, and long rendering time.

In a first aspect, an embodiment of the present disclosure provides an end-cloud collaborative media data processing method including:

calling a target processing flow in response to a first operation triggering a target functionality, where the target processing flow includes a local algorithm node and a remote algorithm node, the local algorithm node is used for calling a media processing algorithm executed on a terminal device side, the remote algorithm node is used for calling a media processing algorithm executed on a server side, and the target functionality is used for adding a special effect to media data to be processed; executing, based on the target processing flow, a corresponding local algorithm node and remote algorithm node to obtain first processing data output by the local algorithm node and second processing data output by the remote algorithm node; and generating third processing data through the first processing data and/or the second processing data, where the third processing data is media data after the special effect is added to the media data to be processed.

In a second aspect, an embodiment of the present disclosure provides an end-cloud collaborative media data processing apparatus including:

a calling module, configured to call a target processing flow in response to a first operation triggering a target functionality, where the target processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed;

an execution module, configured to execute, based on the target processing flow, a corresponding local algorithm node and remote algorithm node to obtain first processing data output by the local algorithm node and second processing data output by the remote algorithm node; and a generating module, configured to generate third processing data through the first processing data and/or the second processing data, where the third processing data is media data after the special effect is added to the media data to be processed.

In a third aspect, an embodiment of the present disclosure provides an electronic device including:

a processor and a memory connected to the processor in a communication way;

where the memory has stored therein computer-executable instructions; and the processor executes the computer-executable instructions stored in the memory to implement the end-cloud collaborative media data processing method described above according to the first aspect and various possible designs of the first aspect.

In a fourth aspect, an embodiment of the present disclosure provides a computer-readable storage medium in which computer-executable instructions are stored, where the computer-executable instructions, when executed by a processor, implement the end-cloud collaborative media data processing method described above according to the first aspect and various possible designs of the first aspect.

In a fifth aspect, an embodiment of the present disclosure provides a computer program product including a computer program, where the computer program, when executed by a processor, implements the end-cloud collaborative media data processing method described above according to the first aspect and various possible designs of the first aspect.

The end-cloud collaborative media data processing method and apparatus, the device, and the storage medium provided in the present embodiment allow for: calling a target processing flow in response to a first operation triggering a target functionality, where the target processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed; executing, based on the target processing flow, the corresponding local algorithm node and remote algorithm node to obtain first processing data output by the local algorithm node and second processing data output by the remote algorithm node; and generating third processing data through the first processing data and/or the second processing data, where the third processing data is media data after the special effect is added to the media data to be processed. In the present application, splitting processing of a complex special effect rendering process is achieved by processing media data respectively by a local algorithm node and a remote algorithm node in a target processing flow corresponding to a target functionality, and then generating media data with addition of a special effect based on processing results of the local algorithm node and the remote algorithm node. With full use of advantages of the local algorithm node and the remote algorithm node, rendering effect of the complex special effect rendering is improved, and time-consuming of the special effect rendering is shortened.

BRIEF DESCRIPTION OF DRAWINGS

In order to explain the embodiments of the present disclosure or the technical solutions in the prior art more clearly, the following will briefly introduce the drawings that need to be used in the description of the embodiments or the prior art. Obviously, the drawings in the following description are some embodiments of the present disclosure, and for those of ordinary skilled in the field, other drawings can be obtained based on these drawings without any creative effort.

DESCRIPTION OF EMBODIMENTS

In order to describe objectives, technical solutions, and advantages of embodiments of the present disclosure more clearly, the technical solutions in the embodiments of the present disclosure will be described hereunder clearly and comprehensively with reference to the accompanying drawings in the embodiments of the present disclosure. Obviously, the described embodiments are only a part of embodiments of the present disclosure, rather than all embodiments of the present disclosure. All other embodiments obtained by those of ordinary skilled in the art based on the embodiments of the present disclosure without any creative effort shall fall into the protection scope of the present disclosure.

Application scenarios of the embodiments of the present disclosure will be explained as follows.

Figure 1:
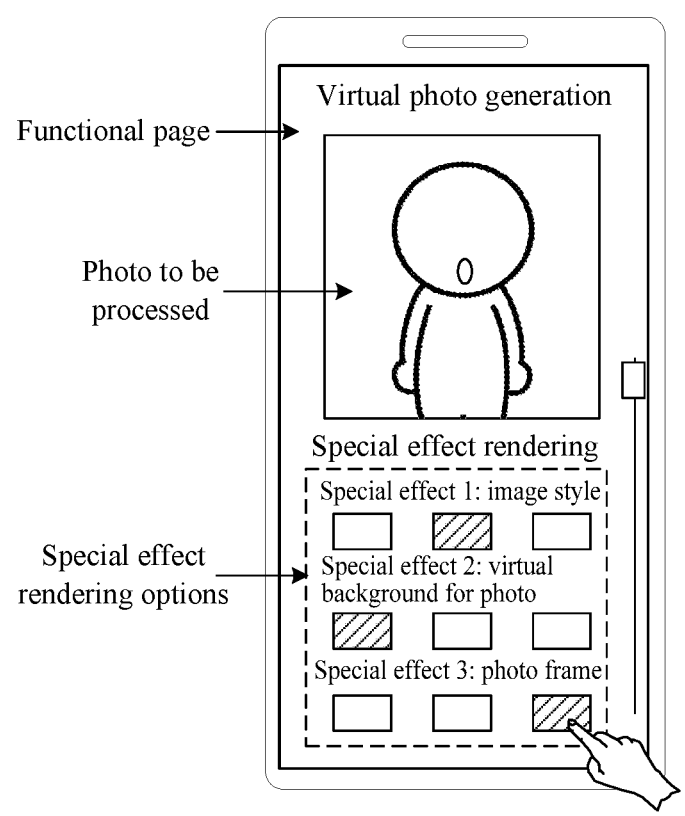
FIG. 1 is a schematic diagram of a functionality page of an APP in which an end-cloud collaborative media data processing method according to an embodiment of the present disclosure is applied.

An end-cloud collaborative media data processing method according to an embodiment of the present disclosure can be applied to application scenarios related to complex media data processing algorithms such as image style transfer and augmented reality (AR) target identification. Specifically, taking an application scenario related to an image style transfer algorithm as an example, the method according to the embodiment of the present disclosure can be applied to a terminal device, such as a smart phone in the drawing, and a target application is running on the terminal device, such as a social media application. FIG. 1 is a schematic diagram of a functionality page of an APP in which an end-cloud collaborative media data processing method according to an embodiment of the present disclosure is applied. As shown in FIG. 1, after a photo to be processed is selected in a functionality page "virtual photo generation" of the target application, the target application provides users with several special effect rendering options, such as "special effect 1: image style", "special effect 2: virtual background for photo" and "special effect 3: photo frame" shown in FIG. 1. Specifically, "special effect 1" is used to add an image style to the image to be processed, such as a comic style and a style for optimization; "special effect 2" is used to add a virtual background to the figure in the image; and "special effect 3" is used to add a "photo frame" around the image for mapping implementation. Among them, "special effect 1" is implemented based on an image style transfer algorithm. A user selects and combines specific effects corresponding to at least two special effect options including "special effect 1" to form a complex render effect. After that, the target application performs, based on the complex render effect, rendering on the photo to be processed that is uploaded by the user, and generates a photo adding such complex render effect, thus completing the function of "virtual photo generation".

In the prior art, during special effect rendering of media data based on an application request, an implementation is typically possible through a separate execution of a local algorithm provided by an application client or separate calling of a remote algorithm provided by a server side, that is, the above-described process of "virtual photo generation" is completed by one algorithm call. However, in the application scenario shown in FIG. 1, when a complex media data processing algorithm is involved in the complex render effect (such as the image style transfer effect corresponding to "special effect 1"), on one hand, due to limitations of computing resources on a terminal device side, the complex media data processing algorithm will be simplified and compressed to meet performance standards of a mobile terminal in case of an implementation by the local algorithm, thereby resulting in a poor rendering effect. On the other hand, it will give rise to a great number of computing resources, bandwidth resources and storage resources during sequential additions of multiple special effects to the image to be processed in case of an implementation by the remote algorithm, thereby increasing the load on a server, and leading to an increase in time consumption of the special effect rendering process.

Therefore, what needs to be currently solved is a problem with regard to how to make full use of resources of a terminal device and a server to improve special effect rendering effects and efficiency during addition of a complex render effect. An embodiment of the present disclosure provides an end-cloud collaborative media data processing method to solve the above-mentioned problem.

Figure 2:
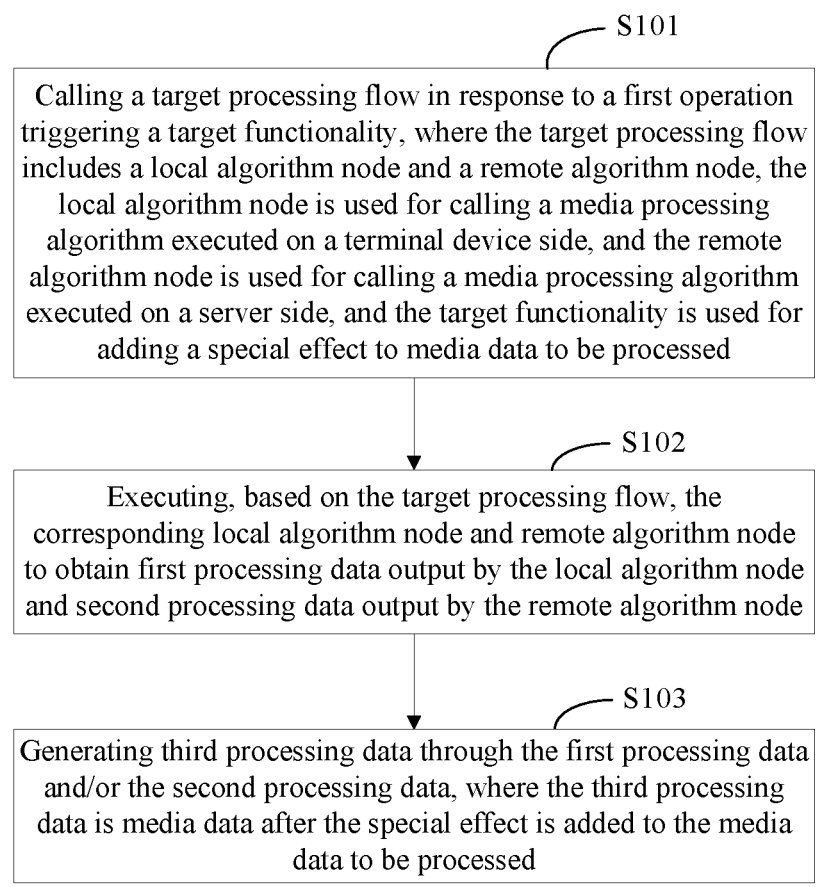
FIG. 2 is a first schematic flow diagram of an end-cloud collaborative media data processing method according to an embodiment of the present disclosure.

FIG. 2 is a first schematic flow diagram of an end-cloud collaborative media data processing method according to an embodiment of the present disclosure. As shown in FIG. 2, the method of the present embodiment can be applied to a terminal device, and the end-cloud collaborative media data processing method includes the following steps.

Step S101: calling a target processing flow in response to a first operation triggering a target functionality, where the target processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed.

Exemplarily, the media data in the present embodiment may be two-dimensional image data, such as a two-dimensional RGB picture, or may be a video composed of multiple frames of two-dimensional pictures, or may also be three-dimensional image data, such as a three-dimensional structural image and a three-dimensional video composed of multiple frames of three-dimensional structural images, or may also be sound data. In the present embodiment, the related media data is illustrated by taking a two-dimensional image as an example, and other similar media data can also be processed based on the end-cloud collaborative media data processing method according to the present embodiment to achieve similar effects, details for which will not be described here again.

In a possible implementation, before step S101, a step for obtaining the media data to be processed is further included, which specifically includes: obtaining the media data to be processed based on pre-stored media data of the terminal device; or obtaining the media data to be processed by a media collection unit of the terminal device collecting media data in real time, where the media data to be processed is input data of the target processing flow. The pre-stored media data of the terminal device is, for example, a picture from a photo album, and based on an operation instruction for a photo album functionality page, an image for adding a special effect is selected, that is, an image to be processed (the media data to be processed). Alternatively, a picture is taken through the media collection unit of the terminal device, such as a camera, in real time, so as to acquire an image for adding a special effect, i.e., an image to be processed.

With further reference to the schematic diagram of the application scenario shown in FIG. 1, there is provided a control for inputting a special effect parameter (that is, an special effect option) in the functionality page of the application client, and the user operates the special effects control to finally determine a rendering effect to be added to the image to be processed, i.e., determining a target functionality. Exemplarily, the functionality page may also include a trigger control for triggering the target functionality, such as a "start to render" button (not shown in the drawing); by touching the trigger control, the user enables the terminal device (the application running inside) to start the target functionality and call a target processing flow corresponding to the target functionality. Where the first operation may be an operation instruction, received by the terminal device, for operating the trigger control so as to start the target functionality, or may be an operation instruction, received by the terminal device, for operating the special effect control so as to input the special effect parameter, or may be a sum of the two. The first operation instruction is not limited here with regard to its specific reference.

Exemplarily, the target processing flow is an execution flow for implementing the target functionality, and the target processing flow includes multiple algorithm nodes, at least including one local algorithm node and one remote algorithm node. The local algorithm node is used for calling a media processing algorithm executed on a terminal device side, and the remote algorithm node is used for calling a media processing algorithm executed on a server side.

In an application scenario where media data undergoes complex special effect rendering, multiple special effect rendering algorithms have a sequential limitation thereamong. Therefore, when special effect parameters are different, corresponding target functionalities are different and corresponding target processing flows are also different.

Figure 3:
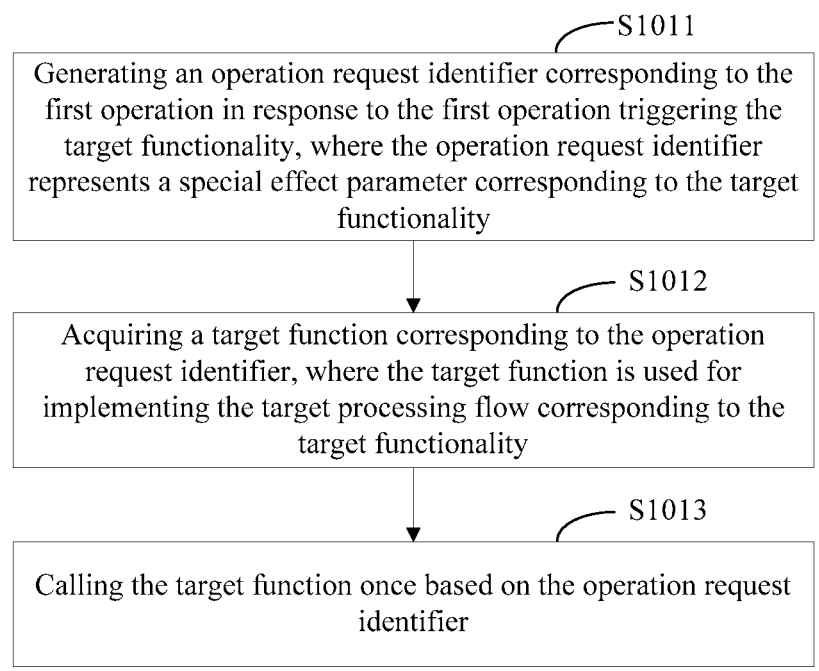
FIG. 3 is a flow chart of specific possible implementation steps of step S101.

Exemplarily, FIG. 3 is a flow chart of specific possible implementation steps of step S101. As shown in FIG. 3, the specific implementation steps of step S101 include:

step S1011, generating an operation request identifier corresponding to the first operation in response to the first operation triggering the target functionality, where the operation request identifier represents a special effect parameter corresponding to the target functionality;

step S1012, acquiring a target function corresponding to the operation request identifier, where the target function is used for implementing the target processing flow corresponding to the target functionality; and step S1013, calling the target function once based on the operation request identifier.

Specifically, the operation request identifier is information representing the special effect parameter of the target functionality, which can be acquired by reading an attribute of a control targeted by the first operation, and a specific implementation of the target functionality can be determined according to the operation request identifier. For example, the operation request identifier is "#01 #02 #03", indicating that three special effects are added to the image to be processed, which are special effect 01, special effect 02 and special effect 03, respectively. And the target function is a function capable of implementing these three special effects. The target function can be acquired based on the operation request identifier and a preset mapping relationship. The target function includes not only implementation methods of the above-described special effects, but also includes an implementation sequence among the special effects, that is, the target function is used to implement the target processing flow corresponding to the target functionality. After the target function is determined, a calling process of the target processing flow can be realized by calling the target function with the operation request identifier as an input parameter.

In the steps of the present embodiment, a calling process of the target processing flow is realized by determining a corresponding target function through the operation request identifier and executing the target function, which achieves, without manual setup of an execution order among multiple special effect rendering algorithms, the determination of the execution order among the multiple special effect rendering algorithms in an application scenario where complex special effect rendering is performed on media data, thereby improving setting efficiency of special effect rendering and ensuring post-rendering image effects.

Further, the target function corresponding to the target processing flow includes multiple sub-functions, through which a local algorithm node and a remote algorithm node are implemented. When the target processing flow is called, that is, the target function corresponding to the target processing flow is called, each local algorithm node and each remote algorithm node are executed sequentially based on an execution order of the sub-functions in the target function.

Step S102: executing, based on the target processing flow, the corresponding local algorithm node and remote algorithm node to obtain first processing data output by the local algorithm node and second processing data output by the remote algorithm node.

Exemplarily, after the target processing flow is determined, nodes (including the local algorithm node and the remote algorithm node) are executed sequentially according to an order of the processing nodes based on the target processing flow, and processing data output by the nodes is obtained. After the local algorithm node is executed, the media processing algorithm (that is, the local algorithm) is executed on the terminal device side and the first processing data is output; and after the remote algorithm node is executed, the media processing algorithm (that is, the remote algorithm) executed on the server side is called and the second processing data is output. In a possible implementation, the local algorithm corresponding to the local algorithm node does not involve a complex media data processing algorithm, that is, an algorithm with low requirements for computing resources (central processing unit (CPU) resources/graphics processing unit (GPU) resources), such as an algorithm for picture-targeted tone rendering and an algorithm for map rendering (adding decorations to pictures). The remote algorithm corresponding to the remote algorithm node involves a complex media data processing algorithm, that is, an algorithm with high requirements for computing resources (CPU resources/GPU resources), such as an image style transfer algorithm, a target identification algorithm and a target classification algorithm. The overall utilization of a terminal device and a server is improved by rendering different special effects with respective use of a local algorithm node and a remote algorithm node, and rendering efficiency and effects of special effects are improved.

Exemplarily, the local algorithm node and the remote algorithm node in the target processing flow can be implemented in a serial or parallel manner. In a possible implementation, the target processing flow includes a first processing flow, the first processing flow includes a first algorithm node and a second algorithm node in serial, and one of the first algorithm node and the second algorithm node is the local algorithm node and the other one of the first algorithm node and the second algorithm node is the remote algorithm node. The specific implementation step of executing, based on the target processing flow, the corresponding local algorithm node and remote algorithm node to obtain the first processing data output by the local algorithm node and the second processing data output by the remote algorithm node includes:

executing, based on the first processing flow, the first algorithm node to obtain first output data; executing, based on the first output data, the second algorithm node to obtain second output data; and acquiring the first processing data and the second processing data according to the first output data and the second output data. Exemplarily, the first algorithm node may be adjacent to or spaced apart from the second algorithm node, and the first output data of the first algorithm node directly or indirectly serves as an input of the second algorithm node, that is, the second output data is generated based on the first output data. Based on the specific implementation of the first algorithm node and the second algorithm node, when the target processing flow is executed in a serial manner, either the execution of the local algorithm node or the execution of the remote algorithm node may be executed first. When the first algorithm node is the local algorithm node, the first output data is the first processing data and the second output data is the second processing data; and when the first algorithm node is the remote algorithm node, the first output data is the second processing data and the second output data is the first processing data.

Figure 4:
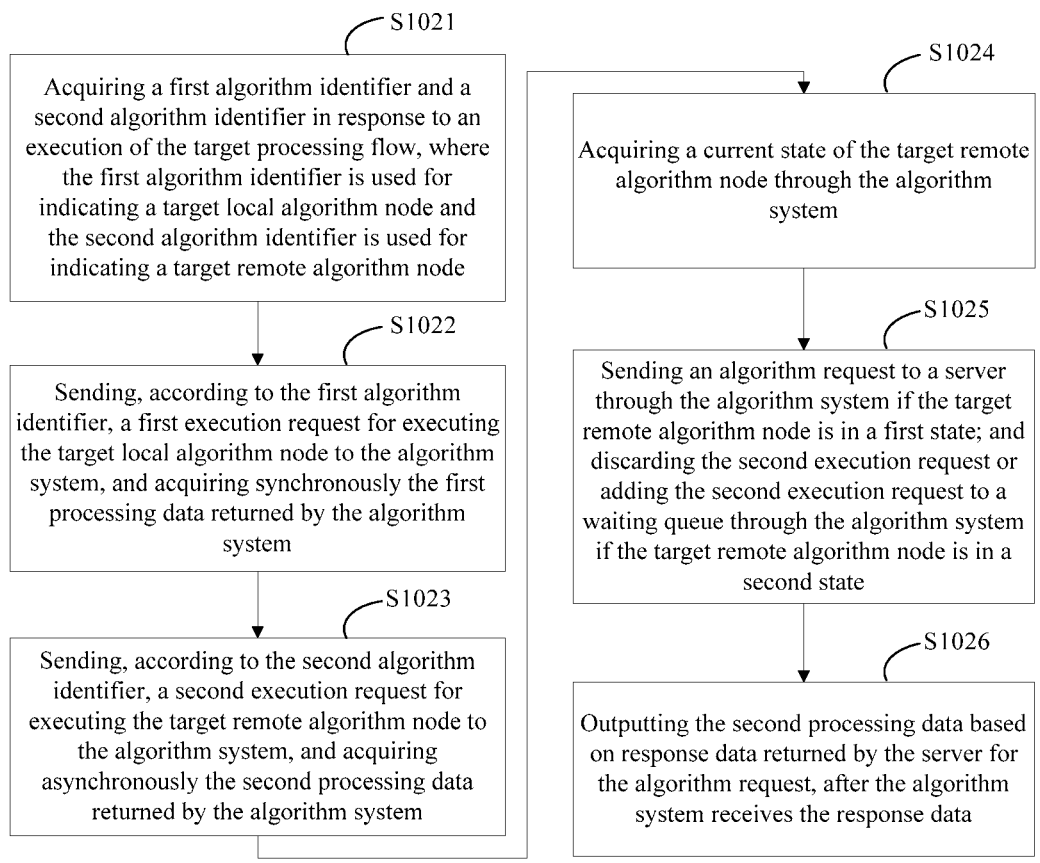
FIG. 4 is a flow chart of specific possible implementation steps of step S102.

Further, the process of executing the local algorithm node and the remote algorithm node based on the target processing flow in step S102 can be implemented by a preset algorithm system in the terminal device. Specifically, the algorithm system may be provided by a target application and run with the startup of the target application client. The algorithm system is used to provide a preset local algorithm node and a preset remote algorithm node. Exemplarily, FIG. 4 is a flow chart of specific possible implementation steps of step S102. As shown in FIG. 4, the specific implementation steps of step S102 include:

step S1021, acquiring a first algorithm identifier and a second algorithm identifier in response to an execution of the target processing flow, where the first algorithm identifier is used for indicating a target local algorithm node and the second algorithm identifier is used for indicating a target remote algorithm node;

step S1022, sending, according to the first algorithm identifier, a first execution request for executing the target local algorithm node to the algorithm system, and acquiring synchronously the first processing data returned by the algorithm system; and step S1023, sending, according to the second algorithm identifier, a second execution request for executing the target remote algorithm node to the algorithm system, and acquiring asynchronously the second processing data returned by the algorithm system.

Figure 5:
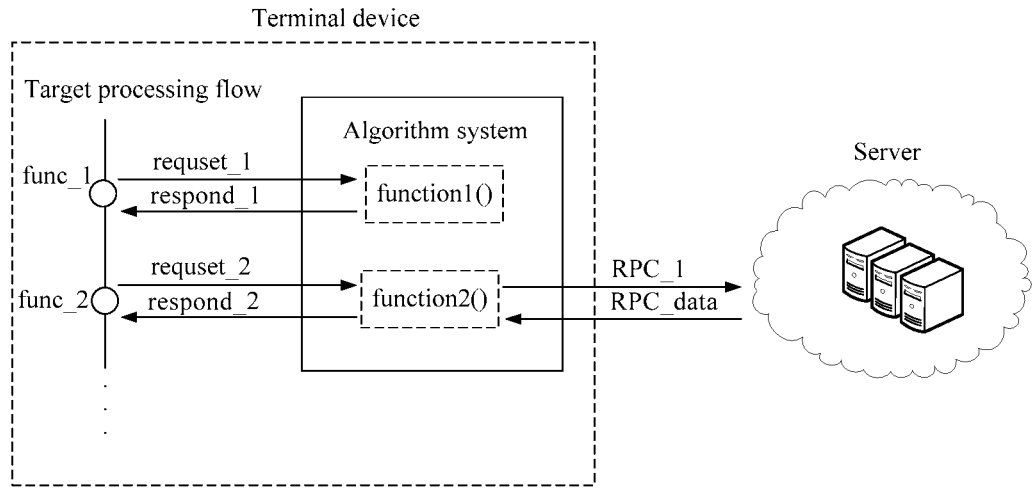
FIG. 5 is a schematic diagram of an algorithm system according to an embodiment of the present disclosure.

FIG. 5 is a schematic diagram of an algorithm system according to an embodiment of the present disclosure, in which the target processing flow is expressed in the form of a script including functions corresponding to different algorithm nodes. During a per-line execution of the script, when running to a function corresponding to an algorithm node, an algorithm identifier, such as a function name, corresponding to the function is acquired. Then, a corresponding execution request is sent to the algorithm system according to the algorithm identifier; and the algorithm system responds based on the execution request and returns processing data. As shown in FIG. 5, based on the target processing flow, when executing a function corresponding to a target local algorithm node with a first algorithm identifier (shown as func_1 in the drawing) as its function name, a first execution request (shown as request_1 in the drawing) is sent to the algorithm system; and the algorithm system calls a corresponding local algorithm (shown as function1( ) in the drawing) according to the first algorithm identifier so as to process an image to be processed (included in the first execution request, but not shown in the drawing), and returns first processing data (shown as respond_1 in the drawing) to the function corresponding to the first algorithm identifier, so that the function corresponding to the first algorithm identifier has an output value which is the first processing data.

When executing to a function corresponding to a target remote algorithm node with a second algorithm identifier (shown as func_2 in the drawing) as its function name, a second execution request (shown as request_2 in the drawing) is sent to the algorithm system. The algorithm system calls a corresponding remote algorithm (shown as function 2( ) in the drawing) according to the second algorithm identifier, sends a remote call request (shown as RPC_1 in the drawing) to the server to request the server side to process an image to be processed (included in the remote call request, but not shown in the drawing), and returns server response data (shown as RPC_data in the drawing) after the processing is completed. Then the algorithm system, after receiving the server response data returned by the server, returns second processing data (shown as respond_2 in the drawing) generated based on the server response data to the function corresponding to the second algorithm identifier (in an asynchronous response manner), so that the function corresponding to the second algorithm identifier has an output value which is the second processing data.

In an implementation, after sending, according to the second algorithm identifier, the second execution request for executing the target remote algorithm node to the algorithm system, the method further includes:

step S1024, acquiring a current state of the target remote algorithm node through the algorithm system;

step S1025, sending an algorithm request to a server through the algorithm system if the target remote algorithm node is in a first state; and discarding the second execution request or adding the second execution request to a waiting queue through the algorithm system if the target remote algorithm node is in a second state; and step S1026, outputting the second processing data based on response data returned by the server for the algorithm request, after the algorithm system receives the response data.

Exemplarily, after the second execution request is sent to the algorithm system, the algorithm system sends a call of the remote algorithm to the server based on the target remote algorithm node and receives response data from the server. However, in an actual application process, the response data returned by the server may not be received immediately due to network congestion, high load of the server or other reasons.

Here, in order to prevent the algorithm system from repeatedly sending algorithm requests for the same second execution request to the server due to repeated user operations, the algorithm system may determine, based on a current state of the target remote algorithm node, whether response data returned by the server for the second execution request is received, where the current state is, for example, a state identifier. Exemplarily, the current state of the target remote algorithm node includes a first state and a second state; where the first state indicates that the response data returned by the server has been received, and the second state indicates that the response data returned by the server has not been received. If the target remote algorithm node is in the first state, it means that the response data has been returned and a new algorithm request can be made; and if the target remote algorithm node is in the second state, it means that no response data is returned and there is a need to join a waiting queue until the server responds or directly discards the second execution request here. Then, after the response data returned for the algorithm request is received, the second processing data is output based on the response data. In the steps of the present embodiment, by detecting the state of the target remote algorithm node, an algorithm request is prevented from being repeatedly sent for many times in case of no response from the server, thereby reducing the load originating from accesses to the server and improving the stability of the server system.

In the steps of the present embodiment, the algorithm system is used to realize an execution process of the target processing flow, so that the implementation of the target processing flow is separated from the implementation of the media processing algorithm, and application coupling is reduced. In a scenario of adding complex render effects to media data, it is possible to conveniently add a combination of the complex render effects, thereby reducing system development costs and maintenance costs under an addition of a special effects type.

Step S103: generating third processing data through the first processing data and/or the second processing data, where the third processing data is media data after the special effect is added to the media data to be processed.

Exemplarily, after the first processing data output by the local algorithm node and the second processing data output by the remote algorithm node are obtained through the above steps, the first processing data and/or the second processing data is processed according to specific flow logic of the target processing flow to obtain the third processing data after a complex render effect is added to the media data to be processed.

Specifically, in a possible implementation, in the process of executing the corresponding local algorithm node and remote algorithm node based on the target processing flow, the local algorithm node and the remote algorithm node are executed in serial, more specifically, for example, after the image to be processed is processed following an execution of the local algorithm node, the first processing data is obtained, and then the second processing data is generated after the first processing data is processed following an execution of the remote algorithm node; in this case, the third processing data is obtained by post-processing the second processing data, or the second processing data is used as the third processing data directly. For another example, after the image to be processed is processed following an execution of the remote algorithm node, the second processing data is obtained, and then the first processing data is generated after the second processing data is processed following an execution of the local algorithm node; in this case, the third processing data is obtained by post-processing the first processing data, or the first processing data is used as the third processing data directly.

In another possible implementation, in the process of executing the corresponding local algorithm node and remote algorithm node based on the target processing flow, the local algorithm node and the remote algorithm node are executed in parallel, that is, the local algorithm node and the remote algorithm node are executed concurrently, synchronously or asynchronously, and the corresponding first processing data and second processing data are obtained respectively. In this case, the third processing data is generated by splicing and fusing the first processing data and the second processing data.

Certainly, in other embodiments, it will be appreciated that the corresponding local algorithm node and remote algorithm node may also be executed in such a manner that the above two manners are blended, so as to generate the third processing data, and details will not be described here for the sake of redundancy. Therefore, more complex special effect rendering effects can be achieved and visual representation of media data can be improved.

The present embodiment allows for: calling a target processing flow in response to a first operation triggering a target functionality, where the target processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed; executing, based on the target processing flow, a corresponding local algorithm node and remote algorithm node to obtain first processing data output by the local algorithm node and second processing data output by the remote algorithm node; and generating third processing data through the first processing data and/or the second processing data, where the third processing data is media data after the special effect is added to the media data to be processed. In the present application, splitting processing of a complex special effect rendering process is achieved by processing media data respectively by a local algorithm node and a remote algorithm node in a target processing flow corresponding to a target functionality, and then generating media data with addition of a special effect based on processing results of the local algorithm node and the remote algorithm node. With full use of advantages of the local algorithm node and the remote algorithm node, rendering effect of the complex special effect rendering is improved, and time-consuming of the special effect rendering is shortened.

Figure 6:
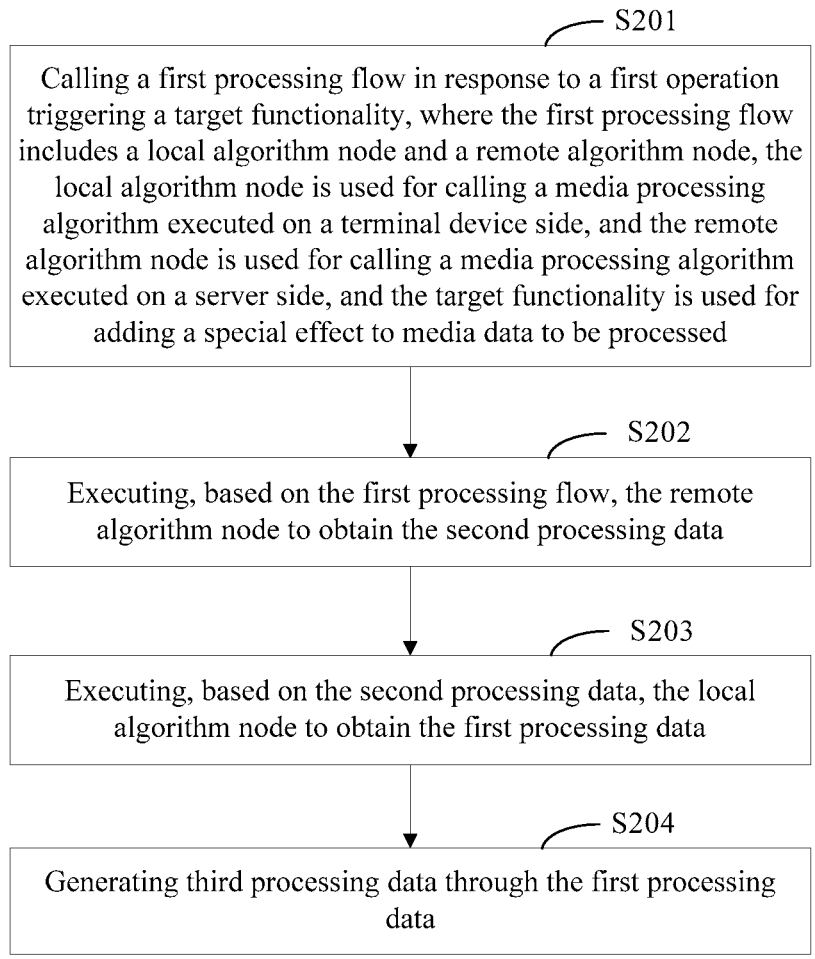
FIG. 6 is a second schematic flow diagram of an end-cloud collaborative media data processing method according to an embodiment of the present disclosure.

FIG. 6 is a second schematic flow diagram of an end-cloud collaborative media data processing method according to an embodiment of the present disclosure. On the basis of the embodiment shown in FIG. 2, in the present embodiment, step S102 is further refined with regard to its implementation steps. The end-cloud collaborative media data processing method includes the following steps.

Step S201: calling a first processing flow in response to a first operation triggering a target functionality, where the first processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed.

Figure 7:
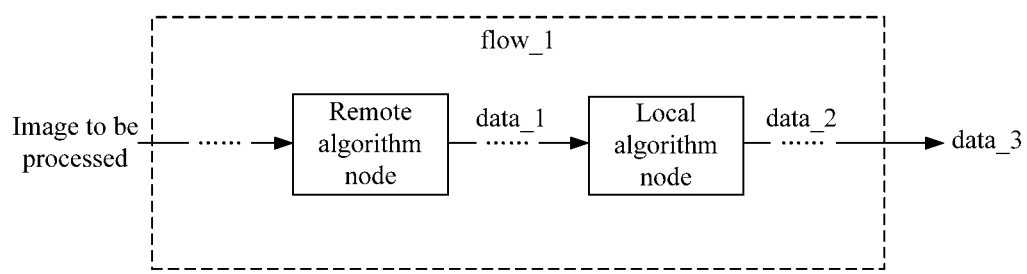
FIG. 7 is a schematic diagram of a first processing flow according to an embodiment of the present disclosure.

Specifically, the target processing flow includes a first processing flow, and the first processing flow includes a first algorithm node and a second algorithm node in serial, and one of the first algorithm node and the second algorithm node is the local algorithm node and the other one of the first algorithm node and the second algorithm node is the remote algorithm node. Further, in a possible implementation, the first algorithm node is a remote algorithm node, and the second algorithm node is a local algorithm node. FIG. 7 is a schematic diagram of a first processing flow according to an embodiment of the present disclosure. As shown in FIG. 7, exemplarily, multiple algorithm nodes are executed in serial according to the flow logic of the first processing flow flow_1. The first processing flow is executed with the image to be processed as an input. First, the image to be processed is processed by the remote algorithm node (before that, a pre-processing step for the image to be processed may also be included, but not shown here) to obtain first output data (shown as data_1 in the drawing); then, the first output data, as a direct input or an indirect input, is processed by the target local algorithm node to obtain second output data (shown as data_2 in the drawing); and finally, based on the second output data, third processing data (shown as data_3 in the drawing) is generated as an output of the first processing flow.

Step S202: executing, based on the first processing flow, the remote algorithm node to obtain the second processing data.

Figure 8:
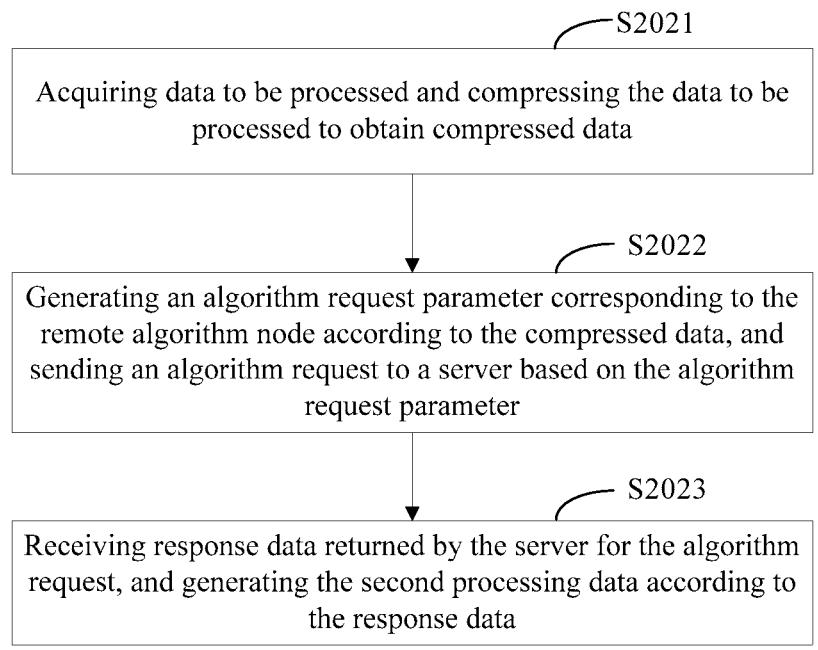
FIG. 8 is a flow chart of specific possible implementation steps of step S202.

FIG. 8 is a flow chart of specific possible implementation steps of step S202. As shown in FIG. 8, the specific implementation steps of step S202 include:

step S2021, acquiring data to be processed and compressing the data to be processed to obtain compressed data;

step S2022, generating an algorithm request parameter corresponding to the remote algorithm node according to the compressed data, and sending an algorithm request to a server based on the algorithm request parameter; and step S2023, receiving response data returned by the server for the algorithm request, and generating the second processing data according to the response data.

Exemplarily, after the remote algorithm node receives inputted data to be processed, it is necessary to transmit the data to be processed to a server for processing since the remote algorithm corresponding to the remote algorithm node needs to be executed on a server side. In order to reduce the time consumption of the special effect rendering process, first, the data to be processed is compressed, for example, a picture to be processed is downsampled or a video to be processed is decimated, so as to reduce the volume of the data to be processed and reduce the network bandwidth and the load of computing resources on the server. Then, an algorithm request parameter is constructed based on the compressed compression data, and an algorithm request is sent to the server based on the algorithm request parameter. After receiving the algorithm request, the server will call a corresponding media data processing algorithm based on the algorithm request parameter, such as a style transfer algorithm or a target identification algorithm, and process the compressed data to obtain response data. The response data is, for example, style transfer image data or target identification data corresponding to the data to be processed. After that, the terminal device carries out relevant processing according to the response data, such as filtering, denoising, upsampling and other processing, and generates the second processing data corresponding to the remote algorithm node; alternatively, it directly uses the response data as the second processing data. For a specific implementation method, settings can be made as required, details for which will not be described here for the sake of redundancy.

Exemplarily, the generating the second processing data according to the response data includes:

packaging the response data based on a node data format of the local algorithm node to generate the second processing data, where the node data format represents a data format of an input parameter of a functional function corresponding to the algorithm node. Specifically, in the present embodiment, it is necessary to input the second processing data outputted by the remote algorithm node into the local algorithm node for second-stage processing subsequently, so as to further add a special effect corresponding to the local algorithm node on the basis of the second processing data. Therefore, the data format of the second processing data needs to match the data format of the input data of the local algorithm node. The response data returned by the server is packaged through the node data format of the local algorithm node, so that the generated second processing data can be directly inputted into the local algorithm node for processing without an additional format conversion, thereby improving the execution efficiency of the target processing flow.

In another possible implementation, the generating the second processing data according to the response data includes: packaging the response data based on a flow data format of the target processing flow to generate the second output data, where the flow data format represents a preset standard data format of a respective algorithm node in the target processing flow. Specifically, for the same reason, the data format of the second processing data needs to match the data format of the input data of the local algorithm node. The response data is packaged based on the standard data format, so that the generated second processing data can be directly inputted into the local algorithm node for processing without an additional format conversion, thereby improving the execution efficiency of the target processing flow.

Exemplarily, the two manners of the second processing data as described above can be implemented based on an algorithm system, that is, based on settings of a local algorithm node and a remote algorithm node in the algorithm system. When response data returned by a server is received, package it so as to generate output data which has a matched data format and can be directly inputted into a subsequent algorithm node.

Step S203: executing, based on the second processing data, the local algorithm node to obtain the first processing data.

Step S204: generating third processing data through the first processing data.

Exemplarily, after the second processing data is acquired, the local algorithm node is executed, and the second processing data is further rendered to obtain the first processing data. Further, the first processing data is post-processed to generate third processing data, or the first processing data is directly used as the third processing data. The specific implementation process has been introduced in the embodiment shown in FIG. 2, details for which will not be described here for the sake of redundancy.

Figure 9:
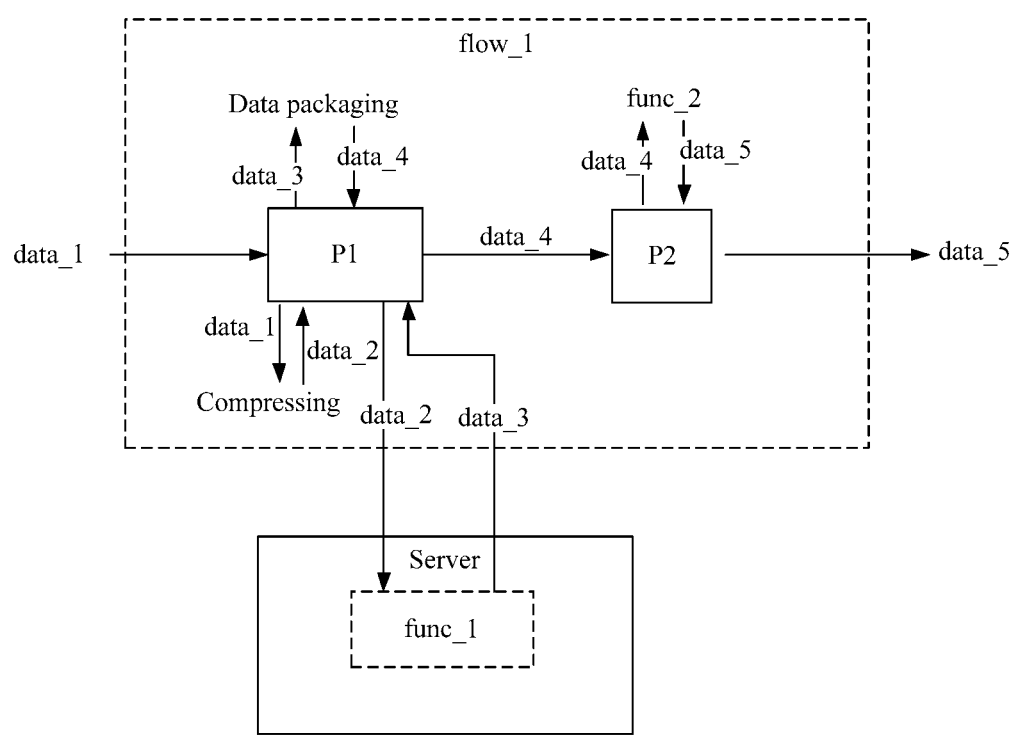
FIG. 9 is a schematic diagram of a process for generating third processing data according to an embodiment of the present disclosure.

FIG. 9 is a schematic diagram of a process for generating third processing data according to an embodiment of the present disclosure. The end-cloud collaborative media data processing method according to the embodiment of the present disclosure will be further explained hereunder in combination with FIG. 9. As shown in FIG. 9, the target processing flow corresponding to the target functionality is flow_1. After the image to be processed data_1 is used as an input for execution of flow_1, first the remote algorithm node P1 in flow_1 is executed, where P1 compresses data_1 to obtain a compressed image data_2 and sends data_2 to a server. After executing a style transfer algorithm func_1 locally, the server returns a processed response image data_3 to P1. P1 adjusts the image format of data_3 (data packaging) to obtain a standard format image data_4, and then sends data_4 to the local algorithm node P2. P2 calls a local mapping algorithm func_2, and adds a photo-frame special effect to data_4 to generate an output image data_5. After that, the terminal device displays data_5 in the application client to complete a complex special effect rendering process. In the present embodiment, during superposition of multiple special effects in a complex special effect rendering scenario corresponding to the first processing flow, addition of a latter special effect can only be carried out after the completion of a previous special effect, for example, fine-tuning after an image style transfer, or adding a personal signature map or other functionalities on a style-transferred image. With the method provided in the present embodiment, it is possible to achieve a serial addition of the multiple special effects in this scenario of the present application, improve image rendering effects, and meet users' personalized requirements for special effects.

Figure 10:
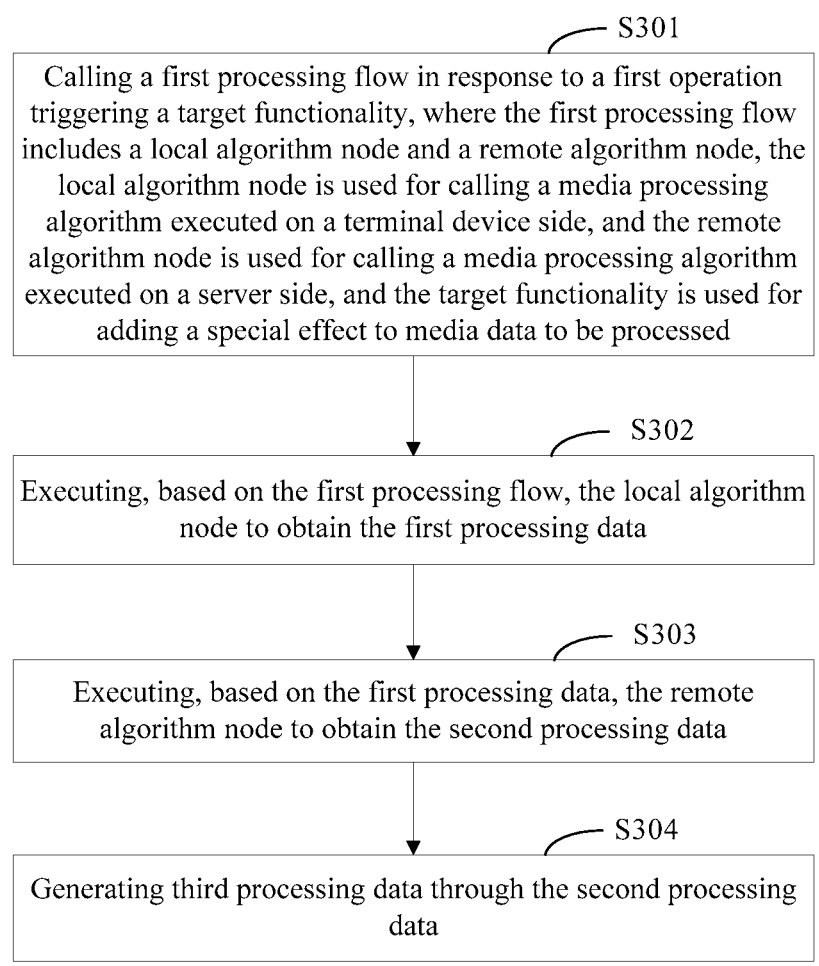
FIG. 10 is a third schematic flow diagram of an end-cloud collaborative media data processing method according to an embodiment of the present disclosure.

FIG. 10 is a third schematic flow diagram of an end-cloud collaborative media data processing method according to an embodiment of the present disclosure. On the basis of the embodiment shown in FIG. 2, in the present embodiment, step S102 is further refined with regard to its implementation steps. The end-cloud collaborative media data processing method includes the following steps.

Step S301: calling a first processing flow in response to a first operation triggering a target functionality, where the first processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed.

Specifically, the target processing flow includes a first processing flow, and the first processing flow includes a first algorithm node and a second algorithm node in serial. In the present embodiment, the first algorithm node is a local algorithm node, and the second algorithm node is a remote algorithm node.

Step S302: executing, based on the first processing flow, the local algorithm node to obtain the first processing data.

Step S303: executing, based on the first processing data, the remote algorithm node to obtain the second processing data.

Step S304: generating third processing data through the second processing data.

In the present embodiment, compared with the embodiment shown in FIG. 6, the local algorithm node is executed first, and then the remote algorithm node is executed. During executing the remote algorithm node, the step of data compression as shown in FIG. 8 and the step of packaging the response data sent by the server may also be included. A specific implementation process is similar to the steps in the embodiment shown in FIG. 6, but only with a different execution sequence, and details will not be described here for the sake of redundancy. Reference may be made to related descriptions in the embodiment shown in FIG. 6 for a specific implementation of the steps.

Figure 11:
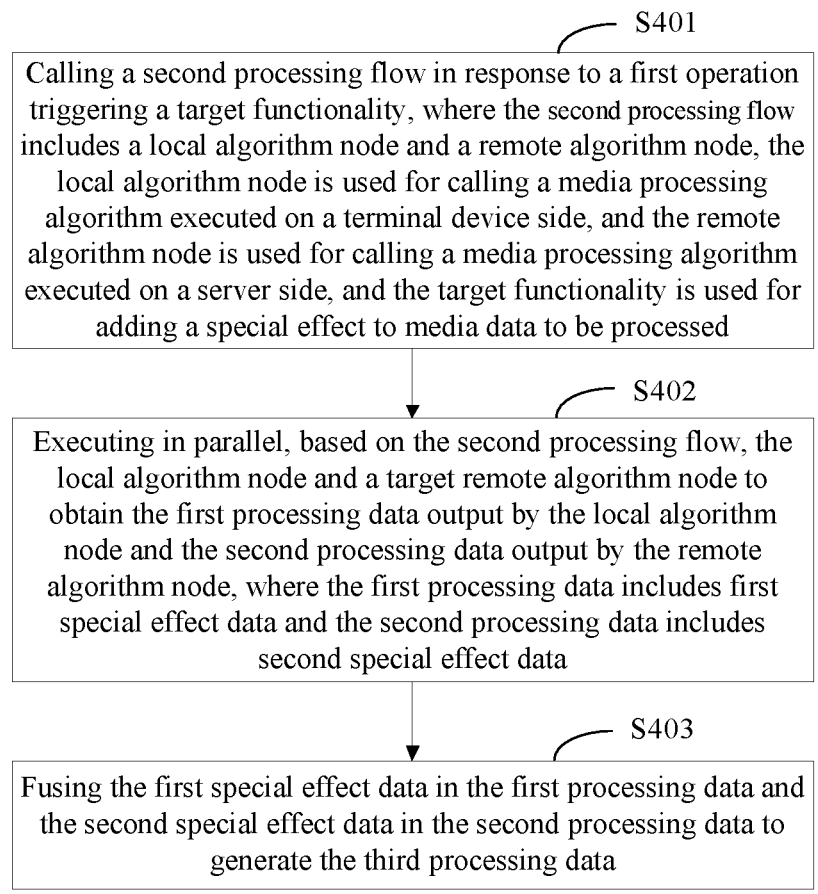
FIG. 11 is a fourth schematic flow diagram of an end-cloud collaborative media data processing method according to an embodiment of the present disclosure.

FIG. 11 is a fourth schematic flow diagram of an end-cloud collaborative media data processing method according to an embodiment of the present disclosure. On the basis of the embodiment shown in FIG. 2, in the present embodiment, steps S102-S103 are further refined with regard to their implementation steps. The end-cloud collaborative media data processing method includes the following steps.

Step S401: calling a second processing flow in response to a first operation triggering a target functionality, where the second processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed.

The target processing flow includes the second processing flow, and the second processing flow includes the remote algorithm node and the local algorithm node in parallel.

Step S402: executing in parallel, based on the second processing flow, the local algorithm node and a target remote algorithm node to obtain the first processing data output by the local algorithm node and the second processing data output by the remote algorithm node, where the first processing data includes first special effect data and the second processing data includes second special effect data.

Figure 12:
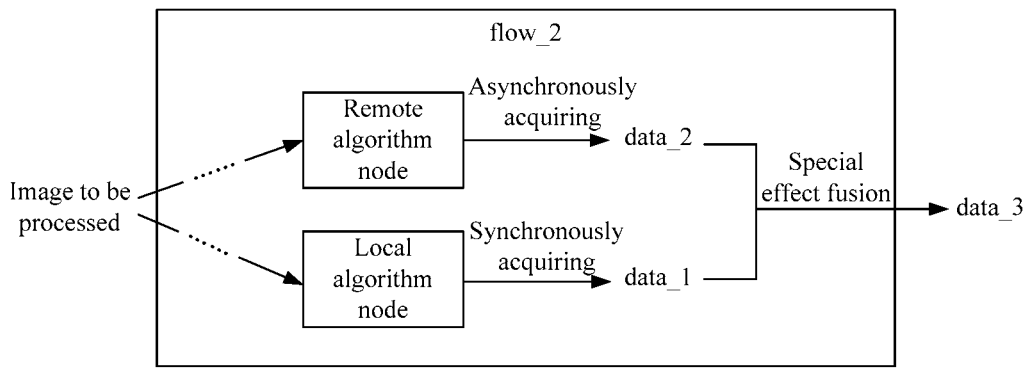
FIG. 12 is a schematic diagram of a second processing flow according to an embodiment of the present disclosure.

FIG. 12 is a schematic diagram of a second processing flow according to an embodiment of the present disclosure. As shown in FIG. 12, the second processing flow flow_2 includes a local algorithm node and a remote algorithm node that are executed in parallel, where the local algorithm node and the remote algorithm node are based on a same input, such as the image to be processed, and after the image to be processed is input into the second processing flow, the local algorithm node and the remote algorithm node directly or indirectly process the image to be processed in a synchronous manner, where the local algorithm node calls a local algorithm executed on the terminal device side to complete image processing, and generates first processing data data_1 in real time. The remote algorithm node sends a request to the server, calls a remote algorithm executed on the server side, and asynchronously obtains second processing data data_2. After that, special effect fusion is performed based on the first processing data data_1 and the second processing data data_2 to generate third processing data data_3.

In the steps of the present embodiment, the local algorithm node and the remote algorithm node are respectively used to process the image to be processed, so as to add corresponding special effects, that is, the first special effect data and the second special effect data, at specified positions of the image to be processed. Exemplarily, the first special effect data is image data obtained based on a simple image rendering algorithm, such as mapping; and the second special effect data is image data obtained based on a complex image rendering algorithm, such as a style-transferred image.

Step S403: fusing the first special effect data in the first processing data and the second special effect data in the second processing data to generate the third processing data.

Figure 13:
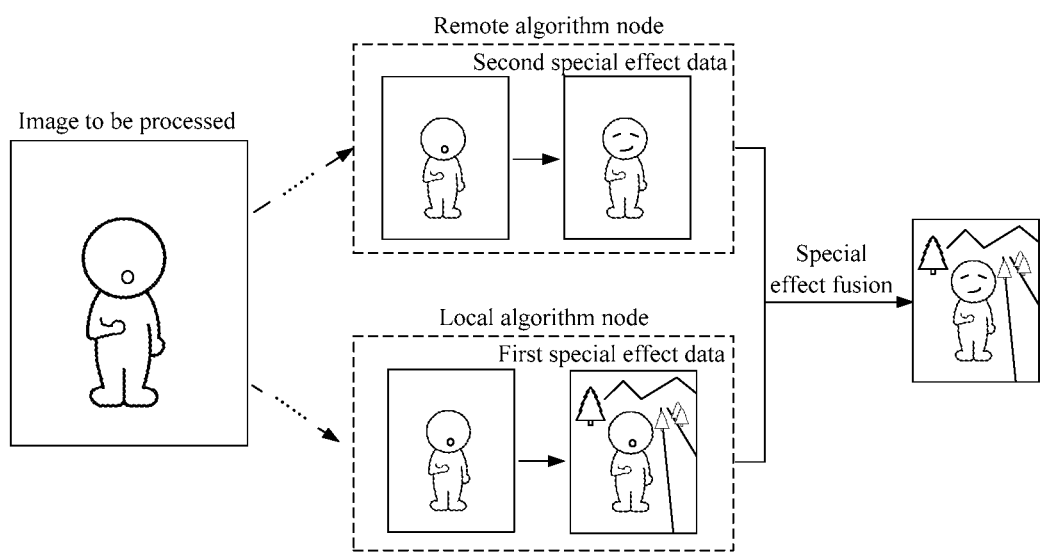
FIG. 13 is a schematic diagram of special effect fusion suitable for a second processing flow according to an embodiment of the present disclosure.

The special effect fusion based on the first special effect data and the second special effect data that are obtained after the local algorithm node and the remote algorithm node are respectively used to process the image to be processed achieves complex special effect rendering of the image. FIG. 13 is a schematic diagram of special effect fusion suitable for a second processing flow according to an embodiment of the present disclosure. As shown in FIG. 13, the image to be processed is a portrait photo to which a face-changing special effect will be added and to which a background map will be added based on a specific target functionality. The addition of the face-changing special effect to the portrait photo is implemented by the remote algorithm node, and the special effect with regard to the addition of the background map to the portrait photo is implemented by the local algorithm node. Different from the first processing flow, since there is no interference between special effect data (that is, a face rendered image) generated by means of face-changing on the face of the portrait photo and special effect data (that is, a background map) generated by means of mapping the background of the portrait photo, it is possible to simultaneously call the local algorithm node and the remote algorithm node in parallel based on the second processing flow to process the image to be processed and generate the corresponding first special effect data and second special effect data, and then perform fusion based on the first special effect data and the second special effect data. Specifically, for example, the first special effect data is on a first layer and the second special effect data is on a second image, and the fusion of the first layer and the second image can produce an image with both the first special effect data (such as the special effect with regard to background mapping) and the second special effect data (such as the special effect with regard to facial part), that is, the third processing data. In the scenario of the present embodiment, the image rendering efficiency can be effectively improved, and the generation speed of complex special effects can be improved.

Figure 14:
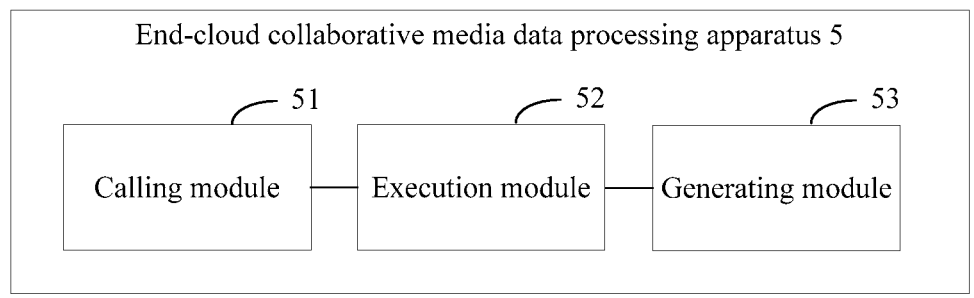
FIG. 14 is a structural block diagram of an end-cloud collaborative media data processing apparatus according to an embodiment of the present disclosure.

Corresponding to the end-cloud collaborative media data processing method in the above embodiments, FIG. 14 is a structural block diagram of an end-cloud collaborative media data processing apparatus according to an embodiment of the present disclosure. For illustrative purposes, only the part related to the embodiments of the present disclosure is shown. With reference to FIG. 14, the end-cloud collaborative media data processing apparatus 5 includes:

a calling module 51, configured to call a target processing flow in response to a first operation triggering a target functionality, where the target processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed;

an execution module 52, configured to execute, based on the target processing flow, the corresponding local algorithm node and remote algorithm node to obtain first processing data output by the local algorithm node and second processing data output by the remote algorithm node; and a generating module 53, configured to generate third processing data through the first processing data and/or the second processing data, where the third processing data is media data after the special effect is added to the media data to be processed.

In an embodiment of the present disclosure, the target processing flow includes a first processing flow, the first processing flow includes a first algorithm node and a second algorithm node in serial, and one of the first algorithm node and the second algorithm node is the local algorithm node and the other one of the first algorithm node and the second algorithm node is the remote algorithm node; and the execution module 52 is specifically configured to: execute, based on the first processing flow, the first algorithm node to obtain first output data; execute, based on the first output data, the second algorithm node to obtain second output data; and acquire the first processing data and the second processing data according to the first output data and the second output data.

In an embodiment of the present disclosure, the first algorithm node is the remote algorithm node, and the second algorithm node is the local algorithm node; when executing, based on the first processing flow, the first algorithm node to obtain the first output data, the execution module 52 is specifically configured to: acquire data to be processed and compress the data to be processed to obtain compressed data; generate an algorithm request parameter corresponding to the remote algorithm node according to the compressed data, and send an algorithm request to a server based on the algorithm request parameter; and receive response data returned by the server for the algorithm request, and generate the first output data according to the response data; when executing, based on the first output data, the second algorithm node to obtain the second output data, the execution module 52 is specifically configured to: call, based on the first output data, a functional function corresponding to a target local algorithm node to obtain the second output data.

In an embodiment of the present disclosure, the data to be processed is image data obtained based on the media data to be processed, and the response data is style transfer image data or target identification data corresponding to the data to be processed.

In an embodiment of the present disclosure, when generating the first output data according to the response data, the execution module 52 is specifically configured to package the response data based on a node data format of the local algorithm node to generate the first output data, where the node data format represents a data format of an input parameter of a functional function corresponding to an algorithm node.

In an embodiment of the present disclosure, the first algorithm node is the local algorithm node, and the second algorithm node is the remote algorithm node;

when executing, based on the first processing flow, the first algorithm node to obtain the first output data, the execution module 52 is specifically configured to: acquire data to be processed, and call a functional function corresponding to the local algorithm node based on the data to be processed to obtain the first output data; when executing, based on the first output data, the second algorithm node to obtain the second output data, the execution module 52 is specifically configured to: compress the first output data to obtain compressed data; generate an algorithm request parameter corresponding to the remote algorithm node according to the compressed data, and send an algorithm request to a server based on the algorithm request parameter; and receive response data returned by the server for the algorithm request, and generate the second processing data according to the response data.

In an embodiment of the present disclosure, when generating the second processing data according to the response data, the execution module 52 is specifically configured to: package the response data based on a flow data format of the target processing flow to generate the first output data, where the flow data format represents a preset standard data format of a respective algorithm node in the target processing flow.

In an embodiment of the present disclosure, the target processing flow includes a second processing flow, the second processing flow includes the remote algorithm node and the local algorithm node in parallel; the execution module 52 is specifically configured to: execute in parallel, based on the second processing flow, the local algorithm node and a target remote algorithm node to obtain the first processing data output by the local algorithm node and the second processing data output by the remote algorithm node.

In an embodiment of the present disclosure, the first processing data includes first special effect data, the second processing data includes second special effect data, and when generating the third processing data through the first processing data and the second processing data, the generating module 53 is specifically configured to: fuse the first special effect data in the first processing data and the second special effect data in the second processing data to generate the third processing data.

In an embodiment of the present disclosure, before executing, based on the target processing flow, the corresponding local algorithm node and remote algorithm node, the calling module 51 is further configured to: obtain the media data to be processed based on pre-stored media data of the terminal device; or obtain the media data to be processed by a media collection unit of the terminal device collecting media data in real time, where the media data to be processed is input data of the target processing flow.

In an embodiment of the present disclosure, an algorithm system is running in the terminal device, and the algorithm system is used for providing a preset local algorithm node and a preset remote algorithm node; and the execution module 52 is specifically configured to: acquire a first algorithm identifier and a second algorithm identifier in response to an execution of the target processing flow, where the first algorithm identifier is used for indicating a target local algorithm node and the second algorithm identifier is used for indicating a target remote algorithm node; send, according to the first algorithm identifier, a first execution request for executing the target local algorithm node to the algorithm system, and acquire synchronously the first processing data returned by the algorithm system; and send, according to the second algorithm identifier, a second execution request for executing the target remote algorithm node to the algorithm system, and acquire asynchronously the second processing data returned by the algorithm system.

In an embodiment of the present disclosure, after sending, according to the second algorithm identifier, the second execution request for executing the target remote algorithm node to the algorithm system, the execution module 52 is further configured to: acquire a current state of the target remote algorithm node through the algorithm system; send an algorithm request to a server through the algorithm system if the target remote algorithm node is in a first state; and discard the second execution request or add the second execution request to a waiting queue through the algorithm system if the target remote algorithm node is in a second state; and output the second processing data based on response data returned by the server for the algorithm request, after the algorithm system receives the response data.

In an embodiment of the present disclosure, the calling module 51 is specifically configured to: generate an operation request identifier corresponding to the first operation in response to the first operation triggering the target functionality, where the operation request identifier represents a special effect parameter corresponding to the target functionality; acquire a target function corresponding to the operation request identifier, where the target function is used for implementing the target processing flow corresponding to the target functionality; and call the target function once based on the operation request identifier.

The calling module 51, the execution module 52 and the generating module 53 are connected sequentially. The end-cloud collaborative media data processing apparatus 5 provided in the present embodiment can execute technical schemes of the above method embodiments; implementation principles and technical effects there between are similar, and details will not be described here again in the present embodiment for the sake of redundancy.

Figure 15:
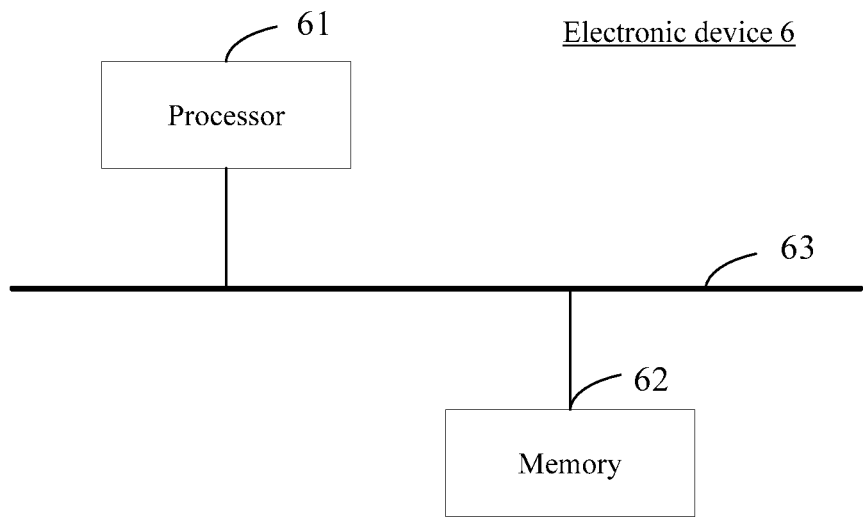
FIG. 15 is a schematic structural diagram of an electronic device according to an embodiment of the present disclosure.

FIG. 15 is a schematic structural diagram of an electronic device according to an embodiment of the present disclosure. As shown in FIG. 15, the electronic device 6 includes:

a processor 61 and a memory 62 communicatively connected to the processor 61;

where the memory 62 has stored therein computer-executable instructions; and the processor 61 executes the computer-executable instructions stored in the memory 62 to implement the end-cloud collaborative media data processing methods in the embodiments shown in FIG. 2 to FIG. 13.

In an implementation, the processor 61 and the memory 62 are connected by a bus 63.

Related descriptions may be comprehended with reference to the related descriptions and effects corresponding to the steps in the embodiments corresponding to FIG. 2 to FIG. 13, and details for which will not be described here for the sake of redundancy.

Figure 16:
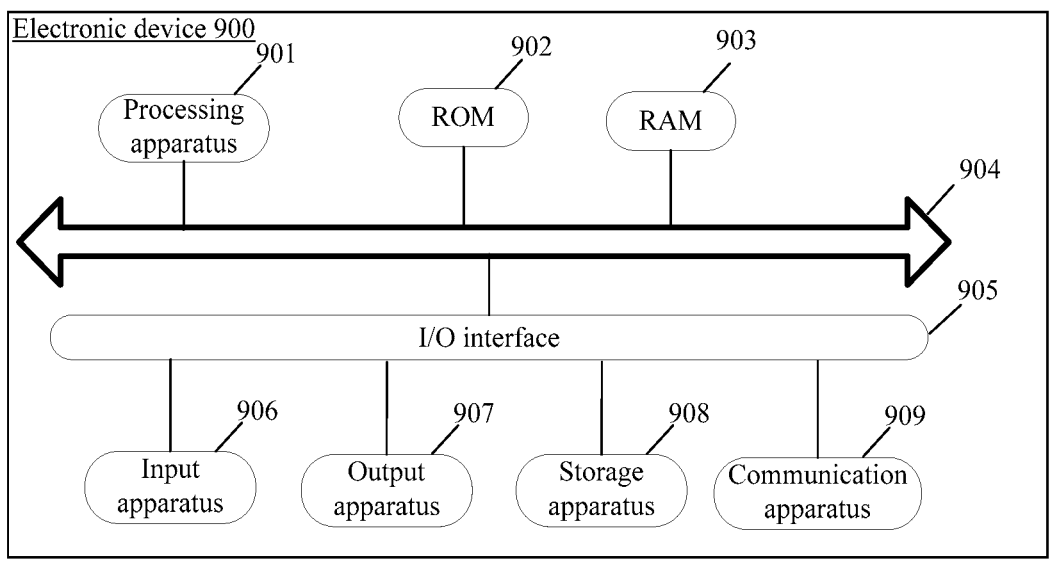
FIG. 16 is a schematic structural diagram of hardware of an electronic device according to an embodiment of the present disclosure.

Reference is made to FIG. 16, which shows a schematic structural diagram of an electronic device 900 for implementing an embodiment of the present disclosure. The electronic device 900 may be a terminal device or a server, where the terminal device may include, but is not limited to, a mobile terminal such as a mobile phone, a notebook computer, a digital broadcast receiver, a personal digital assistant (abbreviated as PDA), a portable android device (abbreviated as PAD), a portable multimedia player (abbreviated as PMP), a vehicle-mounted terminal (such as vehicle-mounted navigation terminal) or the like, and a fixed terminal such as a digital TV, a desktop computer, or the like. The electronic device shown in FIG. 16 is merely an example, which should not impose any restrictions on functionalities and application scope of the embodiments of the present disclosure.

As shown in FIG. 16, the electronic device 900 may include a processing apparatus (such as a central processor, a graphics processor, etc.) 901, which may perform various appropriate actions and processes according to a program stored in a read only memory (abbreviated as ROM) 902 or a program loaded into a random access memory (abbreviated as RAM) 903 from a storage apparatus 908. In the RAM 903, various programs and data required for operations of the electronic device 900 are also stored. The processing apparatus 901, the ROM 902 and the RAM 903 are connected to each other through a bus 904. An input/output (I/O) interface 905 is also connected to the bus 904.

Generally, the following apparatuses may be connected to the I/O interface 905: an input apparatus 906, including, for example, a touch screen, a touch pad, a keyboard, a mouse, a camera, a microphone, an accelerometer, a gyroscope or the like; an output apparatus 907, including, for example, a liquid crystal display (abbreviated as LCD), a speaker, a vibrator or the like; a storage apparatus 908, including, for example, a magnetic tape, a hard disk or the like; and a communication apparatus 909. The communication apparatus 909 may allow the electronic device 900 to communicate wirelessly or wiredly with a further device for data exchange. Although FIG. 16 shows an electronic device 900 with various apparatuses, comprehensibly, there is no such requirement that all the apparatuses shown should be implemented or provided. Alternatively, more or fewer apparatuses may be implemented or provided.

Particularly, according to the embodiments of the present disclosure, the process described above with reference to the flowchart can be implemented as a computer software program. For example, an embodiment of the present disclosure includes a computer program product including a computer program carried on a computer-readable medium, where the computer program contains program codes for executing the method shown in the flowchart. In such an embodiment, the computer program can be downloaded and installed from the network through the communication apparatus 909, or installed from the storage apparatus 908 or from the ROM 902. When executed by the processing apparatus 901, the computer program performs the above-described functionalities defined in the method according to the embodiments of the present disclosure.

It should be noted that the above-described computer-readable medium in the present disclosure may be a computer-readable signal medium or a computer-readable storage medium or any combination thereof. The computer-readable storage medium may be, for example, but not limited to, an electrical, a magnetic, an optical, an electromagnetic, an infrared or a semiconductor system, an apparatus or a device, or any combination of the above. More specific examples of the computer-readable storage medium may include, but not limited to, an electrically connected portable computer disk with one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium in which a program is contained or stored. The program can be used by or in combination with an instruction execution system, apparatus or device. In the present disclosure, the computer-readable signal medium may include a data signal propagated in a baseband or as a part of a carrier wave, where computer-readable program codes are carried. This propagated data signal may be in various forms, including but not limited to electromagnetic signals, optical signals or any suitable combination of the above. The computer-readable signal medium may also be any computer-readable medium other than the computer-readable storage medium. The computer-readable signal medium can send, propagate or transmit the program for use by or in combination with the instruction execution system, apparatus or device. The program codes contained in the computer-readable medium can be transmitted using any suitable medium, including but not limited to: electric wires, optical cables, RF (radio frequency), etc., or any suitable combination of the above.

The computer-readable medium may be included in the above-described electronic device; or it may exist alone without being assembled into the electronic device.

The above-described computer-readable medium carries one or more programs which, when executed by the electronic device, enable the electronic device to execute the methods shown in the above-described embodiments.

Computer program codes for performing the operations of the present disclosure can be written in one or more programming languages or a combination thereof, including object-oriented programming languages such as Java, Smalltalk and C++, and conventional procedural programming languages such as "C" language or similar programming languages. The program codes can be completely executed on a user computer, partially executed on a user computer, executed as an independent software package, partially executed on a user computer and partially executed on a remote computer, or completely executed on a remote computer or a server. In a case related to the remote computer, the remote computer can be connected to a user computer through any kind of networks, including a local area network (abbreviated as LAN) or a wide area network (abbreviated as WAN), or can be connected to an external computer (for example, connecting through Internet with use of an Internet service provider).

The flowcharts and block diagrams in the drawings illustrate architectures, functionalities and operations of possible implementations of the system, the method and the computer program product according to various embodiments of the present disclosure. In this regard, each block in the flowcharts or block diagrams may represent a module, a program segment or part of codes, which contains one or more executable instructions for implementing specified logical functionalities. It should also be noted that in some alternative implementations, the functionalities marked in the blocks may also occur in a different order from that marked in the drawings. For example, two blocks shown in succession can actually be executed in a substantially parallel manner, and sometimes they can be executed in a reverse order, depending on the functionalities involved. It should also be noted that each block in the block diagrams and/or the flowcharts, and a combination of blocks in the block diagrams and/or the flowcharts, may be implemented by a dedicated hardware-based system that performs specified functionalities or operations, or may be implemented by a combination of dedicated hardware and computer instructions.

The units involved in the embodiments described in the present disclosure may be implemented by means of software or hardware. In some cases, unit names do not limit the units. For example, a first acquiring unit can also be described as "a unit acquiring at least two Internet protocol addresses".

The functionalities described above herein can be at least partially performed by one or more hardware logic components. For example, non-restrictively, available hardware logic components that can be used include the following exemplary types: a field programmable gate array (FPGA), an application specific integrated circuit (ASIC), an application specific standard product (ASSP), a system on chip (SOC), a complex programmable logic device (CPLD) and the like.

In the context of the present disclosure, a machine-readable medium can be a tangible medium in which a program for use by or in combination with an instruction execution system, apparatus or device can be contained or stored. The machine-readable medium can be a machine-readable signal medium or a machine-readable storage medium. The machine-readable medium may include, but not limited to, an electronic, a magnetic, an optical, an electromagnetic, an infrared, or a semiconductor system, apparatus or device, or any suitable combination of the foregoing. More specific examples of the machine-readable storage medium may include an electrically connected, portable computer disk based on one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

In a first aspect, according to one or more embodiments of the present disclosure, there is provided an end-cloud collaborative media data processing method applied to a terminal device, the method includes:

calling a target processing flow in response to a first operation triggering a target functionality, where the target processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed; executing, based on the target processing flow, a corresponding local algorithm node and remote algorithm node to obtain first processing data output by the local algorithm node and second processing data output by the remote algorithm node; and generating third processing data through the first processing data and/or the second processing data, where the third processing data is media data after the special effect is added to the media data to be processed.

According to one or more embodiments of the present disclosure, the target processing flow includes a first processing flow, the first processing flow includes a first algorithm node and a second algorithm node in serial, and one of the first algorithm node and the second algorithm node is the local algorithm node and the other one of the first algorithm node and the second algorithm node is the remote algorithm node; and the executing, based on the target processing flow, the corresponding local algorithm node and remote algorithm node to obtain the first processing data output by the local algorithm node and the second processing data output by the remote algorithm node includes: executing, based on the first processing flow, the first algorithm node to obtain first output data; executing, based on the first output data, the second algorithm node to obtain second output data; and acquiring the first processing data and the second processing data according to the first output data and the second output data.

According to one or more embodiments of the present disclosure, the first algorithm node is the remote algorithm node, and the second algorithm node is the local algorithm node; the executing, based on the first processing flow, the first algorithm node to obtain the first output data includes: acquiring data to be processed and compressing the data to be processed to obtain compressed data; generating an algorithm request parameter corresponding to the remote algorithm node according to the compressed data, and sending an algorithm request to a server based on the algorithm request parameter; and receiving response data returned by the server for the algorithm request, and generating the first output data according to the response data; and the executing, based on the first output data, the second algorithm node to obtain the second output data includes: calling, based on the first output data, a functional function corresponding to a target local algorithm node to obtain the second output data.

According to one or more embodiments of the present disclosure, the data to be processed is image data obtained based on the media data to be processed, and the response data is style transfer image data or target identification data corresponding to the data to be processed.

According to one or more embodiments of the present disclosure, the generating the first output data according to the response data includes: packaging the response data based on a node data format of the local algorithm node to generate the first output data, where the node data format represents a data format of an input parameter of a functional function corresponding to an algorithm node.

According to one or more embodiments of the present disclosure, the first algorithm node is the local algorithm node, and the second algorithm node is the remote algorithm node; the executing, based on the first processing flow, the first algorithm node to obtain the first output data includes: acquiring data to be processed, and calling a functional function corresponding to the local algorithm node based on the data to be processed to obtain the first output data; and the executing, based on the first output data, the second algorithm node to obtain the second output data includes: compressing the first output data to obtain compressed data; generating an algorithm request parameter corresponding to the remote algorithm node according to the compressed data, and sending an algorithm request to a server based on the algorithm request parameter; and receiving response data returned by the server for the algorithm request, and generating the second processing data according to the response data.

According to one or more embodiments of the present disclosure, the generating the second processing data according to the response data includes: packaging the response data based on a flow data format of the target processing flow to generate the first output data, where the flow data format represents a preset standard data format of a respective algorithm node in the target processing flow.

According to one or more embodiments of the present disclosure, the target processing flow includes a second processing flow, and the second processing flow includes the remote algorithm node and the local algorithm node in parallel; and the executing, based on the target processing flow, the corresponding local algorithm node and remote algorithm node to obtain the first processing data output by the local algorithm node and the second processing data output by the remote algorithm node includes: executing in parallel, based on the second processing flow, the local algorithm node and a target remote algorithm node to obtain the first processing data output by the local algorithm node and the second processing data output by the remote algorithm node.

According to one or more embodiments of the present disclosure, the first processing data includes first special effect data, the second processing data includes second special effect data, and generating the third processing data through the first processing data and the second processing data includes: fusing the first special effect data in the first processing data and the second special effect data in the second processing data to generate the third processing data.

According to one or more embodiments of the present disclosure, before executing, based on the target processing flow, the corresponding local algorithm node and remote algorithm node, the method further includes: obtaining the media data to be processed based on pre-stored media data of the terminal device; or obtaining the media data to be processed by a media collection unit of the terminal device collecting media data in real time, where the media data to be processed is input data of the target processing flow.

According to one or more embodiments of the present disclosure, an algorithm system is running in the terminal device, and the algorithm system is used for providing a preset local algorithm node and a preset remote algorithm node; and the executing, based on the target processing flow, the corresponding local algorithm node and remote algorithm node to obtain the first processing data output by the local algorithm node and the second processing data output by the remote algorithm node includes: acquiring a first algorithm identifier and a second algorithm identifier in response to an execution of the target processing flow, where the first algorithm identifier is used for indicating a target local algorithm node and the second algorithm identifier is used for indicating a target remote algorithm node; sending, according to the first algorithm identifier, a first execution request for executing the target local algorithm node to the algorithm system, and acquiring synchronously the first processing data returned by the algorithm system; and sending, according to the second algorithm identifier, a second execution request for executing the target remote algorithm node to the algorithm system, and acquiring asynchronously the second processing data returned by the algorithm system.

According to one or more embodiments of the present disclosure, after sending, according to the second algorithm identifier, the second execution request for executing the target remote algorithm node to the algorithm system, the method further includes: acquiring a current state of the target remote algorithm node through the algorithm system; sending an algorithm request to a server through the algorithm system if the target remote algorithm node is in a first state; discarding the second execution request or adding the second execution request to a waiting queue through the algorithm system if the target remote algorithm node is in a second state; and outputting the second processing data based on response data returned by the server for the algorithm request, after the algorithm system receives the response data.

According to one or more embodiments of the present disclosure, the calling the target processing flow in response to the first operation triggering the target functionality includes: generating an operation request identifier corresponding to the first operation in response to the first operation triggering the target functionality, where the operation request identifier represents a special effect parameter corresponding to the target functionality; acquiring a target function corresponding to the operation request identifier, where the target function is used for implementing the target processing flow corresponding to the target functionality; and calling the target function once based on the operation request identifier.

In a second aspect, according to one or more embodiments of the present disclosure, there is provided an end-cloud collaborative media data processing apparatus including:

a calling module, configured to call a target processing flow in response to a first operation triggering a target functionality, where the target processing flow includes a local algorithm node and a remote algorithm node, the local algorithm node is used for calling a media processing algorithm executed on a terminal device side, and the remote algorithm node is used for calling a media processing algorithm executed on a server side, and the target functionality is used for adding a special effect to media data to be processed;

an execution module, configured to execute, based on the target processing flow, a corresponding local algorithm node and remote algorithm node to obtain first processing data output by the local algorithm node and second processing data output by the remote algorithm node; and a generating module, configured to generate third processing data through the first processing data and/or the second processing data, where the third processing data is media data after the special effect is added to the media data to be processed.

According to one or more embodiments of the present disclosure, the target processing flow includes a first processing flow, the first processing flow includes a first algorithm node and a second algorithm node in serial, and one of the first algorithm node and the second algorithm node is the local algorithm node and the other one of the first algorithm node and the second algorithm node is the remote algorithm node; and the execution module is specifically configured to: execute, based on the first processing flow, the first algorithm node to obtain first output data; execute, based on the first output data, the second algorithm node to obtain second output data; and acquire the first processing data and the second processing data according to the first output data and the second output data.

According to one or more embodiments of the present disclosure, the first algorithm node is the remote algorithm node, and the second algorithm node is the local algorithm node; when executing, based on the first processing flow, the first algorithm node to obtain the first output data, the execution module is specifically configured to: acquire data to be processed and compress the data to be processed to obtain compressed data; generate an algorithm request parameter corresponding to the remote algorithm node according to the compressed data, and send an algorithm request to a server based on the algorithm request parameter; and receive response data returned by the server for the algorithm request, and generate the first output data according to the response data; and when executing, based on the first output data, the second algorithm node to obtain the second output data, the execution module is specifically configured to: call, based on the first output data, a functional function corresponding to a target local algorithm node to obtain the second output data.

According to one or more embodiments of the present disclosure, the data to be processed is image data obtained based on the media data to be processed, and the response data is style transfer image data or target identification data corresponding to the data to be processed.

According to one or more embodiments of the present disclosure, when generating the first output data according to the response data, the execution module is specifically configured to package the response data based on a node data format of the local algorithm node to generate the first output data, where the node data format represents a data format of an input parameter of a functional function corresponding to an algorithm node.

According to one or more embodiments of the present disclosure, the first algorithm node is the local algorithm node, and the second algorithm node is the remote algorithm node; when executing, based on the first processing flow, the first algorithm node to obtain the first output data, the execution module is specifically configured to: acquire data to be processed, and call a functional function corresponding to the local algorithm node based on the data to be processed to obtain the first output data; and when executing, based on the first output data, the second algorithm node to obtain the second output data, the execution module is specifically configured to: compress the first output data to obtain compressed data; generate an algorithm request parameter corresponding to the remote algorithm node according to the compressed data, and send an algorithm request to a server based on the algorithm request parameter; and receive response data returned by the server for the algorithm request, and generate the second processing data according to the response data.

According to one or more embodiments of the present disclosure, when generating the second processing data according to the response data, the execution module is specifically configured to: package the response data based on a flow data format of the target processing flow to generate the first output data, where the flow data format represents a preset standard data format of a respective algorithm node in the target processing flow.

According to one or more embodiments of the present disclosure, the target processing flow includes a second processing flow, and the second processing flow includes the remote algorithm node and the local algorithm node in parallel; and the execution module is specifically configured to: execute in parallel, based on the second processing flow, the local algorithm node and a target remote algorithm node to obtain the first processing data output by the local algorithm node and the second processing data output by the remote algorithm node.

According to one or more embodiments of the present disclosure, the first processing data includes first special effect data, the second processing data includes second special effect data, and when generating the third processing data through the first processing data and the second processing data, the generating module is specifically configured to: fuse the first special effect data in the first processing data and the second special effect data in the second processing data to generate the third processing data.

According to one or more embodiments of the present disclosure, before executing, based on the target processing flow, the corresponding local algorithm node and remote algorithm node, the calling module is further configured to: obtain the media data to be processed based on pre-stored media data of the terminal device; or obtain the media data to be processed by a media collection unit of the terminal device collecting media data in real time, where the media data to be processed is input data of the target processing flow.

According to one or more embodiments of the present disclosure, an algorithm system is running in the terminal device, and the algorithm system is used for providing a preset local algorithm node and a preset remote algorithm node; and the execution module is specifically configured to: acquire a first algorithm identifier and a second algorithm identifier in response to an execution of the target processing flow, where the first algorithm identifier is used for indicating a target local algorithm node and the second algorithm identifier is used for indicating a target remote algorithm node; send, according to the first algorithm identifier, a first execution request for executing the target local algorithm node to the algorithm system, and acquire synchronously the first processing data returned by the algorithm system; and send, according to the second algorithm identifier, a second execution request for executing the target remote algorithm node to the algorithm system, and acquire asynchronously the second processing data returned by the algorithm system.

According to one or more embodiments of the present disclosure, after sending, according to the second algorithm identifier, the second execution request for executing the target remote algorithm node to the algorithm system, the execution module is further configured to: acquire a current state of the target remote algorithm node through the algorithm system; send an algorithm request to a server through the algorithm system if the target remote algorithm node is in a first state; discard the second execution request or add the second execution request to a waiting queue through the algorithm system if the target remote algorithm node is in a second state; and output the second processing data based on response data returned by the server for the algorithm request, after the algorithm system receives the response data.

According to one or more embodiments of the present disclosure, the calling module is specifically configured to: generate an operation request identifier corresponding to the first operation in response to the first operation triggering the target functionality, where the operation request identifier represents a special effect parameter corresponding to the target functionality; acquire a target function corresponding to the operation request identifier, where the target function is used for implementing the target processing flow corresponding to the target functionality; and call the target function once based on the operation request identifier.

In a third aspect, according to one or more embodiments of the present disclosure, there is provided an electronic device including a processor and a memory connected to the processor in a communication way;

where the memory has stored therein computer-executable instructions; and the processor executes the computer-executable instructions stored in the memory to implement the end-cloud collaborative media data processing methods described above according to the first aspect and various possible designs of the first aspect.

In a fourth aspect, according to one or more embodiments of the present disclosure, there is provided a computer-readable storage medium in which computer-executable instructions are stored, where the computer-executable instructions, when executed by a processor, implement the end-cloud collaborative media data processing methods described above according to the first aspect and various possible designs of the first aspect.

In a fifth aspect, an embodiment of the present disclosure provides a computer program product including a computer program, where the computer program, when executed by a processor, implements the end-cloud collaborative media data processing methods described above according to the first aspect and various possible designs of the first aspect.

The above descriptions are only preferred embodiments of the present disclosure and illustrations of the applied technical principles. Those skilled in the art should understand that the disclosure scope involved in the present disclosure is not limited to the technical scheme formed from a specific combination of the above-described technical features, but covers other technical schemes formed from any combination of the above-described technical features or their equivalent features without departing from the above disclosed concept, such as a technical scheme formed from replacement of the above-described features with technical features having similar functionalities to those disclosed in (but not limited to) the present disclosure.

Furthermore, although the operations are depicted in a particular order, this does not mean a requirement that these operations should be performed in the particular order shown or in a sequential order. Under certain circumstances, multitasking and parallel processing may be beneficial. Similarly, although the above discussion contains several specific implementation details, these should not be interpreted as limitations on the scope of the present disclosure. Some features described in the context of separate embodiments also may be implemented in a single embodiment in combination. On the contrary, various features described in the context of a single embodiment also may be implemented in multiple embodiments separately or in any suitable sub-combinations.

Although the subject matter has been described in language specific to structural features and/or methodological logical actions, it will be appreciated that the subject matter defined in the appended claims is not necessarily limited to the specific features or actions described above. On the contrary, the specific features and actions described above are only exemplary forms for implementing the claims.

What is claimed is:

1. An end-cloud collaborative media data processing method applied to a terminal device, the method comprising:
    calling a target processing flow in response to a first operation triggering a target functionality, wherein the target processing flow comprises a local algorithm node and a remote algorithm node, the local algorithm node is used for calling a media processing algorithm executed on a terminal device side, the remote algorithm node is used for calling a media processing algorithm executed on a server side, and the target functionality is used for adding a special effect to media data to be processed;
    executing, based on the target processing flow, a corresponding local algorithm node and remote algorithm node to obtain first processing data output by the local algorithm node and second processing data output by the remote algorithm node; and
    generating third processing data through at least one of the first processing data and the second processing data, wherein the third processing data is media data after the special effect is added to the media data to be processed,
    wherein before executing, based on the target processing flow, the corresponding local algorithm node and remote algorithm node, the method further comprises:
    obtaining the media data to be processed based on pre-stored media data of the terminal device; or obtaining the media data to be processed by a media collection unit of the terminal device collecting media data in real time, wherein the media data to be processed is input data of the target processing flow.

2. The method according to claim 1, wherein the target processing flow comprises a first processing flow, the first processing flow comprises a first algorithm node and a second algorithm node in serial, and one of the first algorithm node and the second algorithm node is the local algorithm node and the other one of the first algorithm node and the second algorithm node is the remote algorithm node; and
    the executing, based on the target processing flow, the corresponding local algorithm node and remote algorithm node to obtain the first processing data output by the local algorithm node and the second processing data output by the remote algorithm node comprises:
    executing, based on the first processing flow, the first algorithm node to obtain first output data;
    executing, based on the first output data, the second algorithm node to obtain second output data; and
    acquiring the first processing data and the second processing data according to the first output data and the second output data.

3. The method according to claim 2, wherein the first algorithm node is the remote algorithm node, and the second algorithm node is the local algorithm node;
    the executing, based on the first processing flow, the first algorithm node to obtain the first output data comprises:
    acquiring data to be processed and compressing the data to be processed to obtain compressed data;
    generating an algorithm request parameter corresponding to the remote algorithm node according to the compressed data, and sending an algorithm request to a server based on the algorithm request parameter;
    receiving response data returned by the server for the algorithm request, and generating the first output data according to the response data;
    the executing, based on the first output data, the second algorithm node to obtain the second output data comprises:

calling, based on the first output data, a functional function corresponding to a target local algorithm node to obtain the second output data.

4. The method according to claim 3, wherein the data to be processed is image data obtained based on the media data to be processed, and the response data is style transfer image data or target identification data corresponding to the data to be processed.

5. The method according to claim 3, wherein the generating the first output data according to the response data comprises:
packaging the response data based on a node data format of the local algorithm node to generate the first output data, wherein the node data format represents a data format of an input parameter of a functional function corresponding to an algorithm node.

6. The method according to claim 2, wherein the first algorithm node is the local algorithm node, and the second algorithm node is the remote algorithm node;
the executing, based on the first processing flow, the first algorithm node to obtain the first output data comprises:
acquiring data to be processed, and calling a functional function corresponding to the local algorithm node based on the data to be processed to obtain the first output data; and
the executing, based on the first output data, the second algorithm node to obtain the second output data comprises:
compressing the first output data to obtain compressed data;
generating an algorithm request parameter corresponding to the remote algorithm node according to the compressed data, and sending an algorithm request to a server based on the algorithm request parameter; and
receiving response data returned by the server for the algorithm request, and generating the second processing data according to the response data.

7. The method according to claim 6, wherein the generating the second processing data according to the response data comprises:
packaging the response data based on a flow data format of the target processing flow to generate the first output data, wherein the flow data format represents a preset standard data format of a respective algorithm node in the target processing flow.

8. The method according to claim 1, wherein the target processing flow comprises a second processing flow, and the second processing flow comprises the remote algorithm node and the local algorithm node in parallel; and
the executing, based on the target processing flow, the corresponding local algorithm node and remote algorithm node to obtain the first processing data output by the local algorithm node and the second processing data output by the remote algorithm node comprises:
executing in parallel, based on the second processing flow, the local algorithm node and a target remote algorithm node to obtain the first processing data output by the local algorithm node and the second processing data output by the remote algorithm node.

9. The method according to claim 8, wherein the first processing data comprises first special effect data, the second processing data comprises second special effect data, and generating the third processing data through the first processing data and the second processing data comprises:
fusing the first special effect data in the first processing data and the second special effect data in the second processing data to generate the third processing data.

10. The method according to claim 1, wherein an algorithm system is running in the terminal device, and the algorithm system is used for providing a preset local algorithm node and a preset remote algorithm node; and
the executing, based on the target processing flow, the corresponding local algorithm node and remote algorithm node to obtain the first processing data output by the local algorithm node and the second processing data output by the remote algorithm node comprises:
acquiring a first algorithm identifier and a second algorithm identifier in response to an execution of the target processing flow, wherein the first algorithm identifier is used for indicating a target local algorithm node and the second algorithm identifier is used for indicating a target remote algorithm node;
sending, according to the first algorithm identifier, a first execution request for executing the target local algorithm node to the algorithm system, and acquiring synchronously the first processing data returned by the algorithm system; and
sending, according to the second algorithm identifier, a second execution request for executing the target remote algorithm node to the algorithm system, and acquiring asynchronously the second processing data returned by the algorithm system.

11. The method according to claim 10, after sending, according to the second algorithm identifier, the second execution request for executing the target remote algorithm node to the algorithm system, further comprising:
acquiring a current state of the target remote algorithm node through the algorithm system;
sending an algorithm request to a server through the algorithm system if the target remote algorithm node is in a first state; discarding the second execution request or adding the second execution request to a waiting queue through the algorithm system if the target remote algorithm node is in a second state; and
outputting the second processing data based on response data returned by the server for the algorithm request, after the algorithm system receives the response data.

12. The method according to claim 1, wherein the calling the target processing flow in response to the first operation triggering the target functionality comprises:
generating an operation request identifier corresponding to the first operation in response to the first operation triggering the target functionality, wherein the operation request identifier represents a special effect parameter corresponding to the target functionality;
acquiring a target function corresponding to the operation request identifier, wherein the target function is used for implementing the target processing flow corresponding to the target functionality; and
calling the target function once based on the operation request identifier.

13. An end-cloud collaborative media data processing apparatus applied to a terminal device, comprising:
a processor and a memory connected to the processor in a communication way;
wherein the memory has stored therein computer-executable instructions; and
the computer-executable instructions, when executed by the processor, cause the processor to:
call a target processing flow in response to a first operation triggering a target functionality, wherein the target processing flow comprises a local algorithm node and a remote algorithm node, the local algorithm node is used for calling a media processing algorithm executed on a terminal device side, the remote algorithm node is used for calling a media processing algorithm executed on a server side, and the target functionality is used for adding a special effect to media data to be processed;

execute, based on the target processing flow, a corresponding local algorithm node and remote algorithm node to obtain first processing data output by the local algorithm node and second processing data output by the remote algorithm node; and generate third processing data through at least one of the first processing data and the second processing data, wherein the third processing data is media data after the special effect is added to the media data to be processed, wherein before executing, based on the target processing flow, the corresponding local algorithm node and remote algorithm node, the computer-executable instructions further cause the processor to:

obtain the media data to be processed based on pre-stored media data of the terminal device; or obtain the media data to be processed by a media collection unit of the terminal device collecting media data in real time, wherein the media data to be processed is input data of the target processing flow.

14. The apparatus according to claim 13, wherein the target processing flow comprises a first processing flow, the first processing flow comprises a first algorithm node and a second algorithm node in serial, and one of the first algorithm node and the second algorithm node is the local algorithm node and the other one of the first algorithm node and the second algorithm node is the remote algorithm node; and the computer-executable instructions further cause the processor to:

execute, based on the first processing flow, the first algorithm node to obtain first output data;

execute, based on the first output data, the second algorithm node to obtain second output data; and acquire the first processing data and the second processing data according to the first output data and the second output data.

15. The apparatus according to claim 14, wherein the first algorithm node is the remote algorithm node, and the second algorithm node is the local algorithm node;

the computer-executable instructions further cause the processor to:

acquire data to be processed and compressing the data to be processed to obtain compressed data;

generate an algorithm request parameter corresponding to the remote algorithm node according to the compressed data, and send an algorithm request to a server based on the algorithm request parameter;

receive response data returned by the server for the algorithm request, and generate the first output data according to the response data; and the computer-executable instructions further cause the processor to:

call, based on the first output data, a functional function corresponding to a target local algorithm node to obtain the second output data.

16. The apparatus according to claim 15, wherein the data to be processed is image data obtained based on the media data to be processed, and the response data is style transfer image data or target identification data corresponding to the data to be processed.

17. The apparatus according to claim 15, the computer-executable instructions further cause the processor to:

package the response data based on a node data format of the local algorithm node to generate the first output data, wherein the node data format represents a data format of an input parameter of a functional function corresponding to an algorithm node.

18. The apparatus according to claim 14, wherein the first algorithm node is the local algorithm node, and the second algorithm node is the remote algorithm node;

the computer-executable instructions further cause the processor to:

acquire data to be processed, and call a functional function corresponding to the local algorithm node based on the data to be processed to obtain the first output data; and the computer-executable instructions further cause the processor to:

compress the first output data to obtain compressed data;

generate an algorithm request parameter corresponding to the remote algorithm node according to the compressed data, and send an algorithm request to a server based on the algorithm request parameter; and receive response data returned by the server for the algorithm request, and generate the second processing data according to the response data.

19. A non-transitory computer-readable storage medium in which computer-executable instructions are stored, wherein the computer-executable instructions, when executed by a processor, implement the following steps:

calling a target processing flow in response to a first operation triggering a target functionality, wherein the target processing flow comprises a local algorithm node and a remote algorithm node, the local algorithm node is used for calling a media processing algorithm executed on a terminal device side, the remote algorithm node is used for calling a media processing algorithm executed on a server side, and the target functionality is used for adding a special effect to media data to be processed;

executing, based on the target processing flow, a corresponding local algorithm node and remote algorithm node to obtain first processing data output by the local algorithm node and second processing data output by the remote algorithm node; and generating third processing data through at least one of the first processing data and the second processing data, wherein the third processing data is media data after the special effect is added to the media data to be processed, wherein before executing, based on the target processing flow, the corresponding local algorithm node and remote algorithm node, the computer-executable instructions further implement the following steps:

obtaining the media data to be processed based on pre-stored media data of the terminal device; or obtaining the media data to be processed by a media collection unit of the terminal device collecting media data in real time, wherein the media data to be processed is input data of the target processing flow.

* * * * *